United States Patent
Tanaka et al.

(10) Patent No.: US 8,694,829 B2
(45) Date of Patent: Apr. 8, 2014

(54) COMPUTER PROGRAM PRODUCT, FAILURE DIAGNOSIS METHOD, AND COMMUNICATION APPARATUS

(75) Inventors: Yasuyuki Tanaka, Tokyo (JP); Kotaro Ise, Tokyo (JP); Yasuhiro Katsube, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 145 days.

(21) Appl. No.: 12/560,611

(22) Filed: Sep. 16, 2009

(65) Prior Publication Data

US 2010/0125749 A1 May 20, 2010

(30) Foreign Application Priority Data

Nov. 18, 2008 (JP) .................................. 2008-294891

(51) Int. Cl.
*G06F 11/00* (2006.01)

(52) U.S. Cl.
USPC .......................................................... 714/26

(58) Field of Classification Search
USPC .......................................................... 714/26
See application file for complete search history.

(56) References Cited

U.S. PATENT DOCUMENTS

| | | | |
|---|---|---|---|
| 7,149,895 B1 * | 12/2006 | Asokan et al. ................ | 713/159 |
| 2007/0004398 A1 * | 1/2007 | Juan .............................. | 455/423 |
| 2007/0180088 A1 * | 8/2007 | Zhao .............................. | 709/223 |
| 2008/0052556 A1 * | 2/2008 | Donovan et al. ................... | 714/4 |
| 2011/0113247 A1 * | 5/2011 | Panasyuk et al. ............. | 713/168 |
| 2011/0131332 A1 * | 6/2011 | Bouazizi ........................ | 709/227 |
| 2012/0136935 A1 * | 5/2012 | Tcha et al. ..................... | 709/204 |

FOREIGN PATENT DOCUMENTS

| | | |
|---|---|---|
| JP | 2005-167347 | 6/2005 |
| JP | 2005-197803 | 7/2005 |
| JP | 2006-033251 | 2/2006 |
| JP | 2006-222808 | 8/2006 |
| WO | 2006098279 | 9/2006 |

OTHER PUBLICATIONS

Japanese Office Action for Japanese Application No. 2008-294891 mailed on Sep. 4, 2012.

* cited by examiner

*Primary Examiner* — Amine Riad
(74) *Attorney, Agent, or Firm* — Amin, Turocy & Watson, LLP

(57) ABSTRACT

A first confirmation unit performs a first confirmation of confirming presence of a connection to a correspondent node in a first communication layer, presence of a connection to a correspondent node in a second communication layer, and presence of a connection to a correspondent node in a third communication layer. A locating unit locates a failure point in communication based on a result of the first confirmation. An output unit outputs a result of the location.

21 Claims, 23 Drawing Sheets

FIG.2

| PROCESS NUMBER | DETAILS OF CONFIRMATION PROCESSING |
|---|---|
| 1 | CONFIRM THAT HARDWARE IS NORMALLY OPERATING |
| 2 | CONFIRM THAT WIRELESS LAN INTERFACE IS "EFFECTIVE" |
| 3 | CONFIRM THAT WCS IS "ON" |
| 4 | CONFIRM THAT AUTO CONFIGURATION MODULE (WIRELESS ZERO CONFIGURATION) IS IN OPERATION |
| 5 | CONFIRM THAT NO OTHER SETTING TOOL IS INSTALLED |
| 6 | CONFIRM THAT WIRELESS-LAN CONNECTION PROFILE IS SET |
| 7 | CONFIRM THAT NETWORK OF SSID SET IN WIRELESS LAN PROFILE EXISTS |
| 8 | CONFIRM THAT IP ADDRESS NOT INCLUDED IN LINK LOCAL ADDRESS IS SET |
| 9 | CONFIRM THAT PING TO EVERY ROUTER MULTICAST ADDRESS IS SUCCESSFUL |
| 10 | CONFIRM THAT ADDRESS OF DEFAULT ROUTER IS SET |
| 11 | CONFIRM THAT PING TO EXTERNAL SERVER IS SUCCESSFUL |
| 12 | CONFIRM THAT IP ADDRESS OF DNS SERVER IS SET |
| 13 | CONFIRM THAT PING TO DNS SERVER IS SUCCESSFUL |
| 14 | CONFIRM THAT DNS INQUIRY IS SUCCESSFUL |
| 15 | CONFIRM THAT WEB PROXY SERVER IS NOT SET |
| 16 | CONFIRM THAT PERSONAL FIREWALL IS INEFFECTIVE |
| 17 | CONFIRM THAT ANY SECURITY SOFTWARE PROGRAM IS NOT INSTALLED |

FIG.3

| CONFIRMATION RESULT ABOUT CONNECTION WITH ACCESS POINT | CONFIRMATION RESULT ABOUT CONNECTION WITH ROUTER | CONFIRMATION RESULT ABOUT CONNECTION WITH SERVER | START NUMBER |
|---|---|---|---|
| FAILURE | FAILURE | FAILURE | 1 |
| SUCCESS | FAILURE | FAILURE | 8 |
| ANY | SUCCESS | FAILURE | 11 |
| ANY | ANY | SUCCESS | 15 |

FIG.4

| PROCESS NUMBER OF PROCESS IN FAILURE | PRESENCE OR ABSENCE OF FAILURE RELATED TO NETWORK CONNECTION | FAILURE CAUSE | TROUBLESHOOTING METHOD |
|---|---|---|---|
| 1 | PRESENT | FAULT IN HARDWARE | REPAIR HARDWARE |
| 2 | PRESENT | INADEQUATE SETTING OF WIRELESS LAN INTERFACE | SET WIRELESS LAN INTERFACE TO "EFFECTIVE" |
| 3 | PRESENT | WIRELESS LAN HARDWARE SWITCH IS OFF | TURN WCS ON |
| 4 | PRESENT | AUTO CONFIGURATION MODULE (WIRELESS ZERO CONFIGURATION) IS NOT IN OPERATION | SET AUTO CONFIGURATION MODULE TO EFFECTIVE |
| 5 | PRESENT | INFLUENCE OF ANOTHER SETTING TOOL | DELETE OTHER SETTING TOOL, OR CONFIRM OPERATION MANUAL OF OTHER SETTING TOOL |
| 6 | PRESENT | WIRELESS-LAN CONNECTION PROFILE IS NOT SET | SET WIRELESS-LAN CONNECTION PROFILE |
| 7 | PRESENT | NETWORK OF SSID SET IN WIRELESS LAN PROFILE DOES NOT EXIST | CONFIRM SET VALUE |
| 8 | PRESENT | INAPPROPRIATE SETTING OF IP ADDRESS | PERFORM DHCP DETERMINATION PROCESSING |
| 9 | PRESENT | ABSENCE OF ROUTER | POWER ON ROUTER, OR CONFIRM CONNECTED NETWORK |
| 10 | PRESENT | INADEQUATE SETTING OF DEFAULT ROUTER | SET ADDRESS OF DEFAULT ROUTER |
| 11 | PRESENT | NO EXTERNAL CONNECTION | CONFIRM HOME ROUTER (FOR EXAMPLE, CABLE OF WAN SIDE, POWER OF TERMINATOR DEVICE) |
| 12 | PRESENT | INAPPROPRIATE SETTING IN CONNECTION WITH DNS SERVER | CONFIRM SETTING OF DHCP SERVER, OR SET ADDRESS OF DNS SERVER |
| 13 | PRESENT | ABSENCE OF DNS SERVER | CONFIRM ADDRESS OF DNS SERVER (FOR EXAMPLE, ISP) |
| 14 | PRESENT | FAULT IN DNS SERVER | CONFIRM ADDRESS OF DNS SERVER (FOR EXAMPLE, ISP) |
| 15 | PRESENT | IMPROPER SETTING OF WEB PROXY SERVER | DELETE SETTING OF WEB PROXY SERVER, OR CONFIRM SETTING OF WEB PROXY SERVER |
| 16 | ABSENT | NONE | IF THERE IS PROBLEM, CONFIRM SETTING OF FIREWALL, OR CONFIRM SETTING OF WEB PROXY SERVER AND RELEVANT SETTING |
| 17 | ABSENT | NONE | IF THERE IS PROBLEM, CONFIRM SETTING OF SECURITY SOFTWARE PROGRAM, OR CONFIRM SETTING OF WEB PROXY SERVER AND RELEVANT SETTING |

| PROCESS NUMBER OF PROCESS IN FAILURE | CHARACTER STRING | ERROR CODE | SYMBOL |
|---|---|---|---|
| : | : | : | : |
| 7 | "SETTING ERROR IS FOUND IN WIRELESS LAN CONNECTION. CONFIRM SETTING, AND RECTIFY IT TO CORRECT SETTING." | E-1000 | ♥1 |
| : | : | : | : |

FIG. 13

| PROCESS NUMBER | DETAILS OF CONFIRMATION PROCESSING | PROCESS NUMBER FOR FAILED CASE | PROCESS NUMBER FOR SUCCESSFUL CASE |
|---|---|---|---|
| 1 | CONFIRM THAT HARDWARE IS NORMALLY OPERATING | 0 | 2 |
| 2 | CONFIRM THAT WIRE LAN INTERFACE IS "EFFECTIVE" | 4 | 3 |
| 3 | CONFIRM THAT WIRE LAN INTERFACE IS LINKED UP | 4 | 10 |
| 4 | CONFIRM THAT WIRELESS LAN INTERFACE IS "EFFECTIVE" | 0 | 5 |
| 5 | CONFIRM THAT WCS IS "ON" | 0 | 6 |
| 6 | CONFIRM THAT AUTO CONFIGURATION MODULE (WIRELESS ZERO CONFIGURATION) IS IN OPERATION | 0 | 7 |
| 7 | CONFIRM THAT NO OTHER SETTING TOOL IS INSTALLED | 0 | 8 |
| 8 | CONFIRM THAT WIRELESS-LAN CONNECTION PROFILE IS SET | 0 | 9 |
| 9 | CONFIRM THAT NETWORK OF SSID SET IN WIRELESS LAN PROFILE EXISTS | 0 | 10 |
| 10 | CONFIRM THAT IP ADDRESS NOT INCLUDED IN LINK LOCAL ADDRESS IS SET | 0 | 11 |
| 11 | CONFIRM THAT PING TO EVERY ROUTER MULTICAST ADDRESS IS SUCCESSFUL | 0 | 12 |
| 12 | CONFIRM THAT ADDRESS OF DEFAULT ROUTER IS SET | 0 | 13 |
| 13 | CONFIRM THAT PING TO EXTERNAL SERVER IS SUCCESSFUL | 0 | 14 |
| 14 | CONFIRM THAT IP ADDRESS OF DNS SERVER IS SET | 0 | 15 |
| 15 | CONFIRM THAT PING TO DNS SERVER IS SUCCESSFUL | 0 | 16 |
| 16 | CONFIRM THAT DNS INQUIRY IS SUCCESSFUL | 0 | 17 |
| 17 | CONFIRM THAT WEB PROXY SERVER IS NOT SET | 0 | 18 |
| 18 | CONFIRM THAT PERSONAL FIREWALL IS INEFFECTIVE | 0 | 19 |
| 19 | CONFIRM THAT ANY SECURITY SOFTWARE PROGRAM IS NOT INSTALLED | 0 | 20 |

FIG.14

| CONFIRMATION RESULT ABOUT CONNECTION WITH ACCESS POINT | CONFIRMATION RESULT ABOUT CONNECTION WITH ROUTER | CONFIRMATION RESULT ABOUT CONNECTION WITH SERVER | START NUMBER |
|---|---|---|---|
| FAILURE | FAILURE | FAILURE | 1 |
| SUCCESS | FAILURE | FAILURE | 10 |
| ANY | SUCCESS | FAILURE | 13 |
| ANY | ANY | SUCCESS | 17 |

FIG. 15

| PROCESS NUMBER | PRESENCE OR ABSENCE OF FAILURE RELATED TO NETWORK CONNECTION | FAILURE CAUSE | TROUBLESHOOTING METHOD |
|---|---|---|---|
| 1 | PRESENT | FAULT IN HARDWARE | REPAIR HARDWARE |
| 4 | PRESENT | INADEQUATE SETTING OF WIRELESS LAN INTERFACE | CONNECT WIRE LAN CABLE, OR SET WIRELESS LAN INTERFACE TO "EFFECTIVE" |
| 5 | PRESENT | WIRELESS LAN HARDWARE SWITCH IS OFF | CONNECT WIRE LAN CABLE, OR TURN WCS ON |
| 6 | PRESENT | AUTO CONFIGURATION MODULE (WIRELESS ZERO CONFIGURATION) IS NOT IN OPERATION | CONNECT WIRE LAN CABLE, OR SET AUTO CONFIGURATION MODULE TO EFFECTIVE |
| 7 | PRESENT | INFLUENCE OF ANOTHER SETTING TOOL | CONNECT WIRE LAN CABLE, OR DELETE OTHER SETTING TOOL, OR CONFIRM OPERATION MANUAL OF OTHER SETTING TOOL |
| 8 | PRESENT | WIRELESS-LAN CONNECTION PROFILE IS NOT SET | CONNECT WIRE LAN CABLE, OR SET WIRELESS-LAN CONNECTION PROFILE |
| 9 | PRESENT | NETWORK OF SSID SET IN WIRELESS LAN PROFILE DOES NOT EXIST | CONNECT WIRE LAN CABLE, OR CONFIRM SET VALUE |
| 10 | PRESENT | INAPPROPRIATE SETTING OF IP ADDRESS | PERFORM DHCP DETERMINATION PROCESSING |
| 11 | PRESENT | ABSENCE OF ROUTER | POWER ON ROUTER, OR CONFIRM CONNECTED NETWORK |
| 12 | PRESENT | INADEQUATE SETTING OF DEFAULT ROUTER | SET ADDRESS OF DEFAULT ROUTER |
| 13 | PRESENT | NO EXTERNAL CONNECTION | CONFIRM HOME ROUTER (FOR EXAMPLE, CABLE OF WAN SIDE, POWER OF TERMINATOR DEVICE) |
| 14 | PRESENT | INAPPROPRIATE SETTING IN CONNECTION WITH DNS SERVER | CONFIRM SETTING OF DHCP SERVER, OR SET ADDRESS OF DNS SERVER |
| 15 | PRESENT | ABSENCE OF DNS SERVER | CONFIRM ADDRESS OF DNS SERVER (FOR EXAMPLE, ISP) |
| 16 | PRESENT | FAULT IN DNS SERVER | CONFIRM ADDRESS OF DNS SERVER (FOR EXAMPLE, ISP) |
| 17 | PRESENT | IMPROPER SETTING OF WEB PROXY SERVER | DELETE SETTING OF WEB PROXY SERVER, OR CONFIRM SETTING OF WEB PROXY SERVER |
| 18 | ABSENT | NONE | IF THERE IS PROBLEM, CONFIRM SETTING OF FIREWALL, OR CONFIRM SETTING OF WEB PROXY SERVER AND RELEVANT SETTING |
| 19 | ABSENT | NONE | IF THERE IS PROBLEM, CONFIRM SETTING OF SECURITY SOFTWARE PROGRAM, OR CONFIRM SETTING OF WEB PROXY SERVER AND RELEVANT SETTING |

| PROCESS NUMBER OF PROCESS IN FAILURE | CHARACTER STRING | ERROR CODE | SYMBOL | WINDOW |
|---|---|---|---|---|
| : | : | : | : | : |
| 7 | "SETTING ERROR IS FOUND IN WIRELESS LAN CONNECTION. CONFIRM SETTING, AND RECTIFY IT TO CORRECT SETTING." | E-1000 | ♥1 | A |
| : | : | : | : | : |

FIG.20

WIRELESS-LAN
CONNECTION SETTING

| | |
|---|---|
| NETWORK NAME | mynetwork |
| SECURITY | ********** |
| TYPE OF SECURITY | AES |
| ENCODING METHOD | WPA2-PSK |

CONFIRM

FIG.21

IP ADDRESS SETTING

| | |
|---|---|
| USE OF DHCP | ACTIVE |
| IP ADDRESS | ****** |
| NETWORK MASK | ****** |
| DEFAULT ROUTER | ****** |

CONFIRM

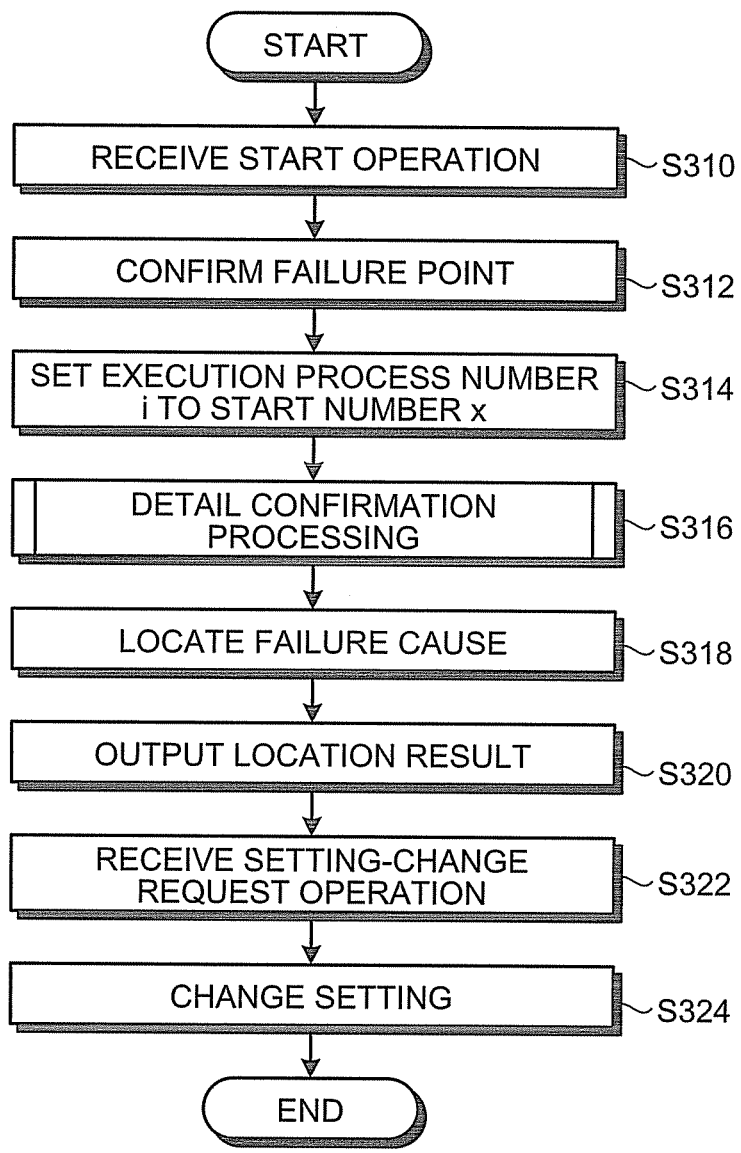

FIG.23

| PROCESS NUMBER | DETAILS OF CONFIRMATION PROCESSING |
|---|---|
| 1 | CONFIRM THAT HARDWARE IS NORMALLY OPERATING |
| 2 | CONFIRM THAT WIRELESS LAN INTERFACE IS "EFFECTIVE" |
| 3 | CONFIRM THAT WCS IS "ON" |
| 4 | CONFIRM THAT AUTO CONFIGURATION MODULE (WIRELESS ZERO CONFIGURATION) IS IN OPERATION |
| 5 | CONFIRM THAT NO OTHER SETTING TOOL IS INSTALLED |
| 6 | CONFIRM THAT WIRELESS-LAN CONNECTION PROFILE IS SET |
| 7 | CONFIRM THAT NETWORK OF SSID SET IN WIRELESS LAN PROFILE EXISTS |
| 8 | CONFIRM THAT WIRELESS LAN CONNECTION IS ESTABLISHED |
| 9 | CONFIRM THAT IP ADDRESS NOT INCLUDED IN LINK LOCAL ADDRESS IS SET |
| 10 | CONFIRM THAT PING TO EVERY ROUTER MULTICAST ADDRESS IS SUCCESSFUL |
| 11 | CONFIRM THAT ADDRESS OF DEFAULT ROUTER IS SET |
| 12 | CONFIRM THAT PING TO DEFAULT ROUTER IS SUCCESSFUL |
| 13 | CONFIRM THAT PING TO EXTERNAL SERVER IS SUCCESSFUL |
| 14 | CONFIRM THAT IP ADDRESS OF DNS SERVER IS SET |
| 15 | CONFIRM THAT PING TO DNS SERVER IS SUCCESSFUL |
| 16 | CONFIRM THAT DNS INQUIRY IS SUCCESSFUL |
| 17 | CONFIRM THAT HTTP REQUEST TO EXTERNAL SERVER IS SUCCESSFUL |
| 18 | CONFIRM THAT WEB PROXY SERVER IS NOT SET |
| 19 | CONFIRM THAT PERSONAL FIREWALL IS INEFFECTIVE |
| 20 | CONFIRM THAT ANY SECURITY SOFTWARE PROGRAM IS NOT INSTALLED |

FIG.24

| PROCESS NUMBER | PRESENCE OR ABSENCE OF FAILURE RELATED TO NETWORK CONNECTION | FAILURE CAUSE | TROUBLESHOOTING METHOD |
|---|---|---|---|
| 1 | PRESENT | FAULT IN HARDWARE | REPAIR HARDWARE |
| 2 | PRESENT | INADEQUATE SETTING OF WIRELESS LAN INTERFACE | SET WIRELESS LAN INTERFACE TO "EFFECTIVE" |
| 3 | PRESENT | WIRELESS LAN HARDWARE SWITCH IS OFF | TURN WCS ON |
| 4 | PRESENT | AUTO CONFIGURATION MODULE (WIRELESS ZERO CONFIGURATION) IS NOT IN OPERATION | SET AUTO CONFIGURATION MODULE TO EFFECTIVE |
| 5 | PRESENT | INFLUENCE OF ANOTHER SETTING TOOL | DELETE OTHER SETTING TOOL, OR CONFIRM OPERATION MANUAL OF OTHER SETTING TOOL |
| 6 | PRESENT | WIRELESS-LAN CONNECTION PROFILE IS NOT SET | SET WIRELESS-LAN CONNECTION PROFILE |
| 7 | PRESENT | NETWORK OF SSID SET IN WIRELESS LAN PROFILE DOES NOT EXIST | CONFIRM SET VALUE |
| 8 | PRESENT | INCONSISTENCY IN SECURITY PARAMETER | CONFIRM SET VALUE |
| 9 | PRESENT | INAPPROPRIATE SETTING OF IP ADDRESS | PERFORM DHCP DETERMINATION PROCESSING |
| 10 | PRESENT | ABSENCE OF ROUTER | POWER ON ROUTER, OR CONFIRM CONNECTED NETWORK |
| 11 | PRESENT | INADEQUATE SETTING OF DEFAULT ROUTER | SET ADDRESS OF DEFAULT ROUTER |
| 12 | PRESENT | MISTAKE IN SETTING OF DEFAULT ROUTER | CONFIRM SET VALUE |
| 13 | PRESENT | NO EXTERNAL CONNECTION | CONFIRM HOME ROUTER (FOR EXAMPLE, CABLE OF WAN SIDE, POWER OF TERMINATOR DEVICE) |
| 14 | PRESENT | INAPPROPRIATE SETTING IN CONNECTION WITH DNS SERVER | CONFIRM SETTING OF DHCP SERVER, OR SET ADDRESS OF DNS SERVER |
| 15 | PRESENT | ABSENCE OF DNS SERVER | CONFIRM ADDRESS OF DNS SERVER (FOR EXAMPLE, ISP) |
| 16 | PRESENT | FAULT IN DNS SERVER | CONFIRM ADDRESS OF DNS SERVER (FOR EXAMPLE, ISP) |
| 17 | PRESENT | IMPROPER SETTING OF WEB PROXY SERVER | DELETE SETTING OF WEB PROXY SERVER, OR CONFIRM SETTING OF WEB PROXY SERVER |
| 18 | PRESENT | MISTAKE IN SETTING OF WEB PROXY SERVER | CONFIRM SETTING OF WEB PROXY SERVER AND RELEVANT SETTING |
| 19 | ABSENT | NONE | IF THERE IS PROBLEM, CONFIRM SETTING OF FIREWALL, OR CONFIRM SETTING OF WEB PROXY SERVER AND RELEVANT SETTING |
| 20 | ABSENT | NONE | IF THERE IS PROBLEM, CONFIRM SETTING OF SECURITY SOFTWARE PROGRAM, OR CONFIRM SETTING OF WEB PROXY SERVER AND RELEVANT SETTING |

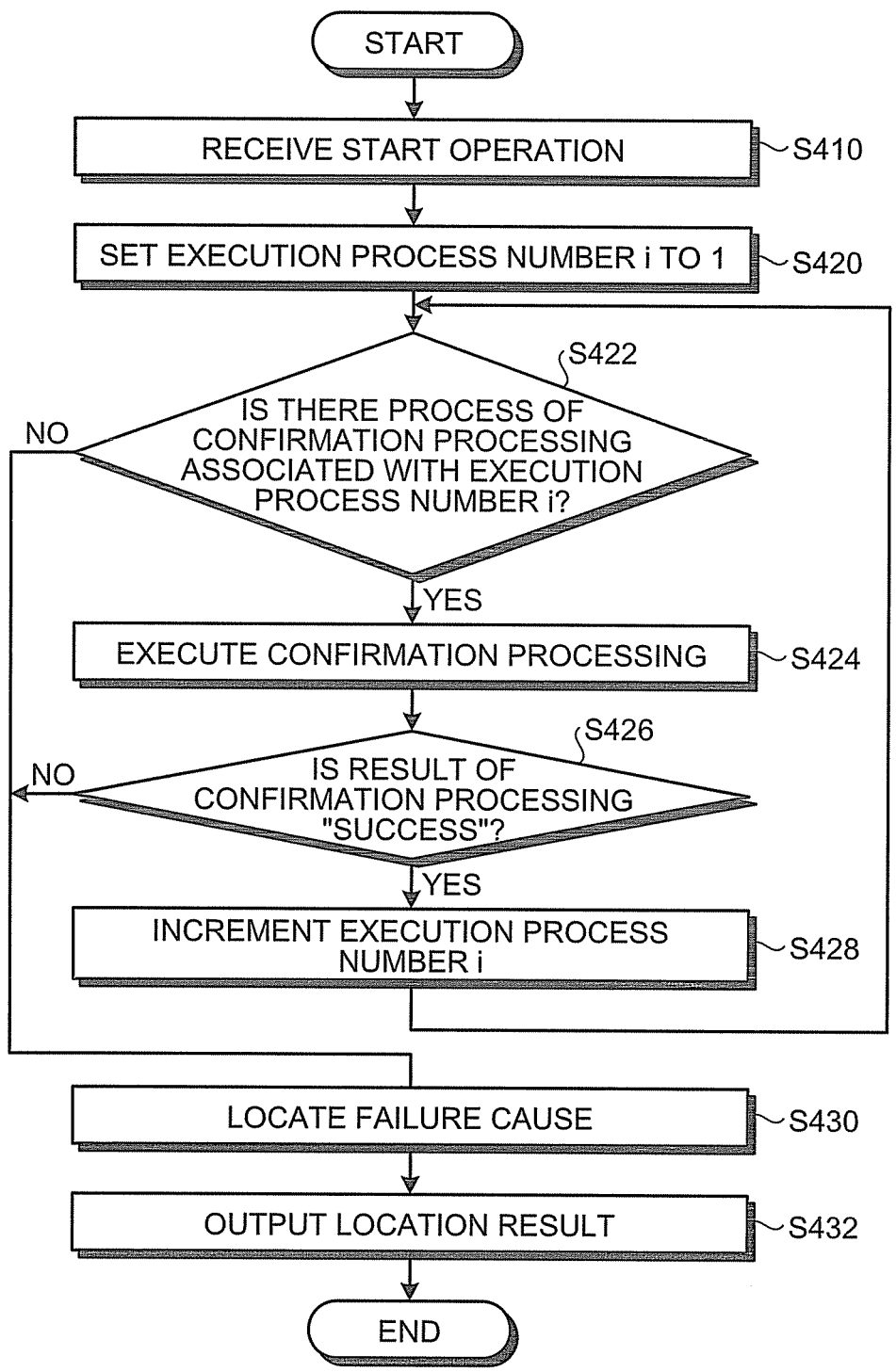

FIG.26

| PROCESS NUMBER | DETAILS OF CONFIRMATION PROCESSING |
|---|---|
| 0 | CONFIRM THAT HTTP REQUEST TO EXTERNAL SERVER IS SUCCESSFUL |
| 1 | CONFIRM THAT DNS INQUIRY IS SUCCESSFUL |
| 2 | CONFIRM THAT PING TO DNS SERVER IS SUCCESSFUL |
| 3 | CONFIRM THAT IP ADDRESS OF DNS SERVER IS SET |
| 4 | CONFIRM THAT PING TO EXTERNAL SERVER IS SUCCESSFUL |
| 5 | CONFIRM THAT PING TO DEFAULT ROUTER IS SUCCESSFUL |
| 6 | CONFIRM THAT ADDRESS OF DEFAULT ROUTER IS SET |
| 7 | CONFIRM THAT PING TO EVERY ROUTER MULTICAST ADDRESS IS SUCCESSFUL |
| 8 | CONFIRM THAT IP ADDRESS NOT INCLUDED IN LINK LOCAL ADDRESS IS SET |
| 9 | CONFIRM THAT WIRELESS LAN CONNECTION IS ESTABLISHED |
| 10 | CONFIRM THAT NETWORK OF SSID SET IN WIRELESS LAN PROFILE EXISTS |
| 11 | CONFIRM THAT WIRELESS-LAN CONNECTION PROFILE IS SET |
| 12 | CONFIRM THAT NO OTHER SETTING TOOL IS INSTALLED |
| 13 | CONFIRM THAT AUTO CONFIGURATION MODULE (WIRELESS ZERO CONFIGURATION) IS IN OPERATION |
| 14 | CONFIRM THAT WCS IS "ON" |
| 15 | CONFIRM THAT WIRELESS LAN INTERFACE IS "EFFECTIVE" |
| 16 | CONFIRM THAT HARDWARE IS NORMALLY OPERATING |

FIG.27

| PROCESS NUMBER | PRESENCE OR ABSENCE OF FAILURE RELATED TO NETWORK CONNECTION | FAILURE CAUSE | TROUBLESHOOTING METHOD |
|---|---|---|---|
| 0 | ABSENT | NONE | IF THERE IS PROBLEM, CONFIRM SETTINGS OF SECURITY SOFTWARE PROGRAM AND FIREWALL, OR CONFIRM SETTING OF WEB PROXY SERVER AND RELEVANT SETTING |
| 1 | PRESENT | IMPROPER SETTING OF WEB PROXY SERVER | DELETE SETTING OF WEB PROXY SERVER, OR CONFIRM SETTING OF WEB PROXY SERVER |
| 2 | PRESENT | FAULT IN DNS SERVER | CONFIRM ADDRESS OF DNS SERVER (FOR EXAMPLE, ISP) |
| 3 | PRESENT | ABSENCE OF DNS SERVER | CONFIRM ADDRESS OF DNS SERVER (FOR EXAMPLE, ISP) |
| 4 | PRESENT | INAPPROPRIATE SETTING IN CONNECTION WITH DNS SERVER | CONFIRM SETTING OF DHCP SERVER, OR SET ADDRESS OF DNS SERVER |
| 5 | PRESENT | NO EXTERNAL CONNECTION | CONFIRM HOME ROUTER (FOR EXAMPLE, CABLE OF WAN SIDE, POWER OF TERMINATOR DEVICE) |
| 6 | PRESENT | MISTAKE IN SETTING OF DEFAULT ROUTER | CONFIRM SET VALUE |
| 7 | PRESENT | INADEQUATE SETTING OF DEFAULT ROUTER | SET ADDRESS OF DEFAULT ROUTER |
| 8 | PRESENT | ABSENCE OF ROUTER | POWER ON ROUTER, OR CONFIRM CONNECTED NETWORK |
| 9 | PRESENT | INAPPROPRIATE SETTING OF IP ADDRESS | PERFORM DHCP DETERMINATION PROCESSING |
| 10 | PRESENT | INCONSISTENCY IN SECURITY PARAMETER | CONFIRM SET VALUE |
| 11 | PRESENT | NETWORK OF SSID SET IN WIRELESS LAN PROFILE DOES NOT EXIST | CONFIRM SET VALUE |
| 12 | PRESENT | WIRELESS-LAN CONNECTION PROFILE IS NOT SET | SET WIRELESS-LAN CONNECTION PROFILE |
| 13 | PRESENT | AUTO CONFIGURATION MODULE (WIRELESS ZERO CONFIGURATION) IS NOT IN OPERATION | SET AUTO CONFIGURATION MODULE TO EFFECTIVE |
| 14 | PRESENT | INFLUENCE OF ANOTHER SETTING TOOL | DELETE OTHER SETTING TOOL, OR CONFIRM OPERATION MANUAL OF OTHER SETTING TOOL |
| 15 | PRESENT | WIRELESS LAN HARDWARE SWITCH IS OFF | TURN WCS ON |
| 16 | PRESENT | INADEQUATE SETTING OF WIRELESS LAN INTERFACE | SET WIRELESS LAN INTERFACE TO "EFFECTIVE" |
| 17 | PRESENT | FAULT IN HARDWARE | REPAIR HARDWARE |

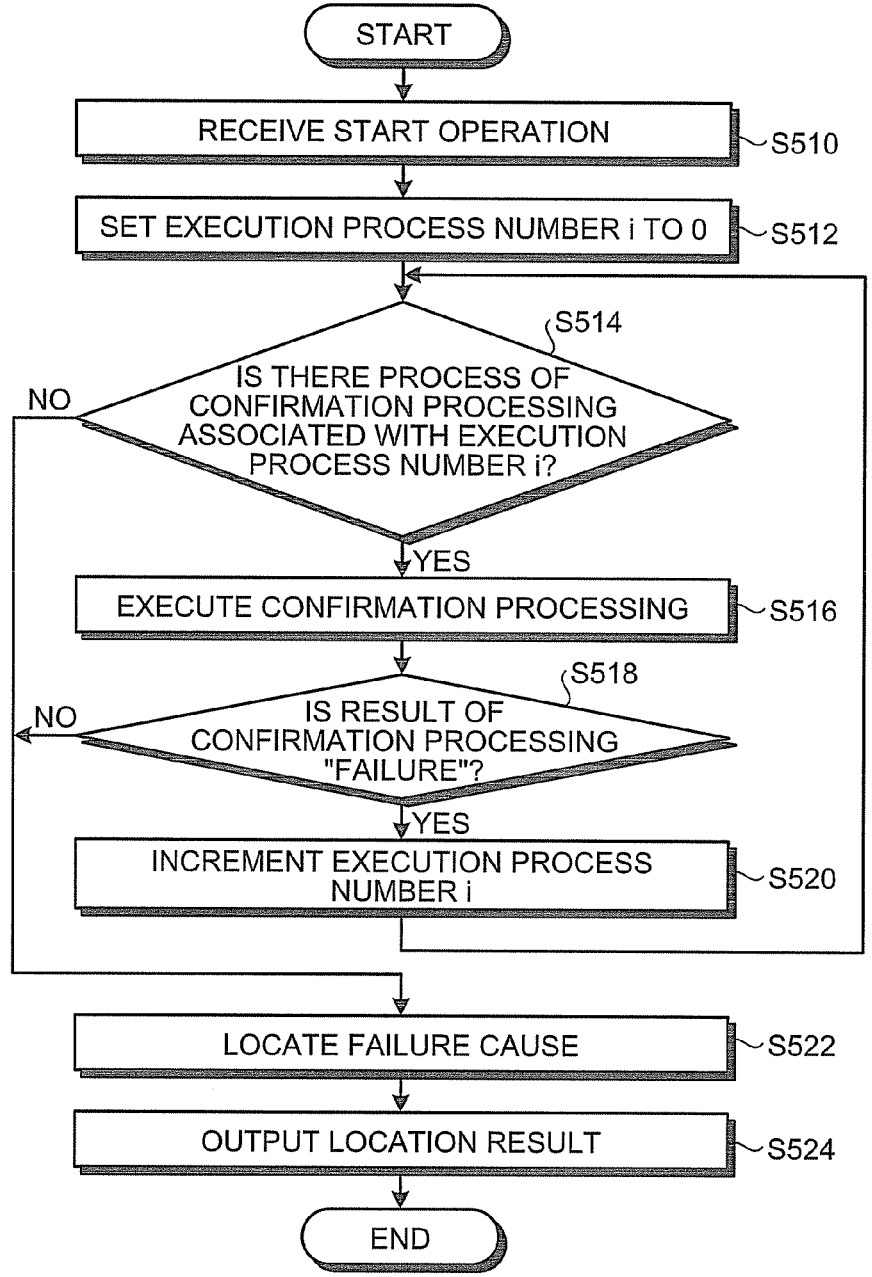

COMPUTER PROGRAM PRODUCT, FAILURE DIAGNOSIS METHOD, AND COMMUNICATION APPARATUS

CROSS-REFERENCE TO RELATED APPLICATIONS

This application is based upon and claims the benefit of priority from the prior Japanese Patent Application No. 2008-294891, filed on Nov. 18, 2008; the entire contents of which are incorporated herein by reference.

BACKGROUND OF THE INVENTION

1. Field of the Invention

The present invention relates to a computer program product, a failure diagnosis method, and a communication apparatus.

2. Description of the Related Art

Conventionally, a wireless communication apparatus configured to be connected to a network by a wireless communication method is widely known. Such wireless communication apparatus more often suffers from a communication failure than a wired communication apparatus due to its characteristics. It is difficult for a user without having specialized knowledge to locate a cause of a communication failure and to remove a located failure by him/herself.

For this reason, JP-A 2006-33251 (KOKAI) proposes a technology of identifying the state of a radio wave of wireless communication and presenting it to a user for allowing the user to find details of a failure in wireless communication and a countermeasure to the failure.

However, a communication failure in a wireless communication apparatus is not limited to a radio wave failure in wireless communication, but also various factors are conceivable, for example, a connection between a wireless communication apparatus and a router and a server is not established due to a setting error. As a result, according to the above conventional technology, when a communication failure occurs due to a factor of other than a wireless communication, it is still difficult for a user without having specialized knowledge to identify and to remove a cause of a communication failure.

SUMMARY OF THE INVENTION

According to one aspect of the present invention, a computer program product having a computer readable medium including programmed instructions to diagnose a failure configured to be executable by a computer, wherein the instructions, when executed by a computer, cause the computer to perform: performing a first confirmation of confirming presence of a connection to a correspondent node in a first communication layer, presence of a connection to a correspondent node in a second communication layer, and presence of a connection to a correspondent node in a third communication layer; locating a failure point in communication based on a result of the first confirmation; and performing output control of causing an output unit to output a result of the locating.

According to another aspect of the present invention, a failure diagnosis method includes performing a first confirmation of confirming presence of a connection to a correspondent node in a first communication layer, presence of a connection to a correspondent node in a second communication layer, and presence of a connection to a correspondent node in a third communication layer; locating a failure point in communication based on a result of the first confirmation; and causing an output unit to output a result of the locating.

According to still another aspect of the present invention, a communication apparatus includes a first confirmation unit that performs a first confirmation of confirming presence of a connection to a correspondent node in a first communication layer, presence of a connection to a correspondent node in a second communication layer, and presence of a connection to a correspondent node in a third communication layer; a locating unit that locates a failure point in communication based on a result of the first confirmation; and an output unit that outputs a result of the locating.

BRIEF DESCRIPTION OF THE DRAWINGS

FIG. 2 is a diagram of an example of a process table according to the first embodiment;

FIG. 3 is a diagram of an example of a start-process determination table according to the first embodiment;

FIG. 4 is a diagram of an example of a failure-cause location table according to the first embodiment;

FIG. 13 is a diagram of an example of a process table according to the third embodiment;

FIG. 14 is a diagram of an example of a start-process determination table according to the third embodiment;

FIG. 15 is a diagram of an example of a failure-cause location table according to the third embodiment;

FIG. 20 is a diagram of an example of a setting screen according to the fourth embodiment;

FIG. 21 is a diagram of an example of a setting screen according to the fourth embodiment;

FIG. 22 is a flowchart of an example of fault diagnosis processing according to the fourth embodiment;

FIG. 23 is a diagram of an example of a process table according to a modification of the present invention;

FIG. 24 is a diagram of an example of a failure-cause location table according to the modification;

FIG. 25 is a flowchart of an example of fault diagnosis processing according to the modification;

FIG. 26 is a diagram of an example of a process table of another modification of the present invention;

FIG. 27 is a diagram of an example of a failure-cause location table according to the modification;

FIG. 28 is a flowchart of an example of fault diagnosis processing according to the modification; and FIG. 29 is a diagram of an example of setting-change table according to still another modification of the present invention.

DETAILED DESCRIPTION OF THE INVENTION

Exemplary embodiments of a computer program product, a failure diagnosis method, and a communication apparatus according to the present invention will be explained below in detail with reference to the accompanying drawings.

Figure 1:
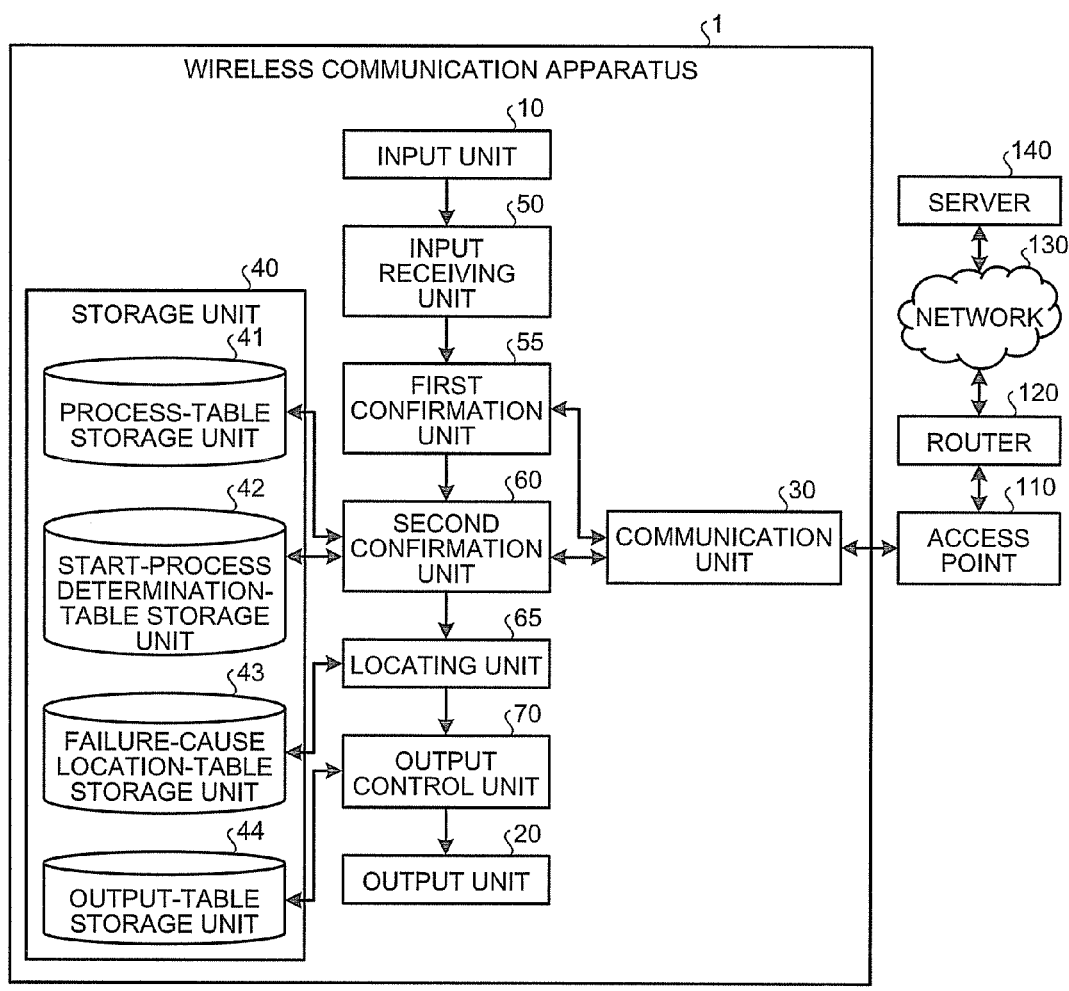
FIG. 1 is a functional block diagram of an example of a configuration of a wireless communication apparatus according to a first embodiment of the present invention.

As shown in FIG. 1, a wireless communication apparatus 1 is connected to a server 140 via an access point 110, a router 120, and a network 130. Although the first embodiment is explained below with reference to the configuration shown in FIG. 1, an access point can be a router that has an access-point function, and can be applied to those having respective functions.

The wireless communication apparatus 1 is connected to the access point 110 according to a communication method, such as a wireless Local Area Network (LAN) (for example, IEEE 802.11g). Moreover, the access point 110 is connected to the router 120 according to a communication method, for example, IEEE 802.3. Furthermore, the router 120 is connected to the network 130, for example, according to an Asymmetric Digital Subscriber Line (ADSL), or an optical communication method, such as a Gigabit Ethernet (registered trademark)-Passive Optical Network (GE-PON), and the network 130 can be implemented by, for example, the Internet. Moreover, the network 130 is connected to the server 140 that communicates with the wireless communication apparatus 1, and the server 140 can be implemented by a Web server or a mail server.

According to the first embodiment, it can be assumed that communication between the wireless communication apparatus 1 and the access point 110 is a first communication layer, communication between the wireless communication apparatus 1 and the router 120 is a second communication layer, and communication between the wireless communication apparatus 1 and the server 140 is a third communication layer. The first embodiment is explained below in a case where the first layers are wireless communication, however, not limited to this, one of the first to third communication layer can be wireless communication or wired communication.

The wireless communication apparatus 1 can diagnose a failure occurring in communication with the server 140 via the access point 110, the router 120, and the network 130. As shown in FIG. 1, the wireless communication apparatus 1 includes an input unit 10, an output unit 20, a communication unit 30, a storage unit 40, an input receiving unit 50, a first confirmation unit 55, a second confirmation unit 60, a locating unit 65, and an output control unit 70.

The input unit 10 performs input of various operations into the wireless communication apparatus 1, and can be implemented by an existing input device, for example, a pointing device and a keyboard.

The output unit 20 outputs failure details and a failure cause, and can be implemented by an existing display device, for example, a liquid crystal display. The output unit 20 can be implemented by an existing audio output device, such as a speaker, or can be implemented by using both a display device and an audio output device.

The communication unit 30 performs wireless communication with the access point 110, and communicates with the server 140 via the access point 110, the router 120, and the network 130. Specifically, the communication unit 30 requests a resource to the server 140, and receives a response from the server 140. When a request for a resource to the server 140 is failed, it means that a communication failure occurs in one of the wireless communication apparatus 1, the access point 110, the router 120, and the server 140.

The storage unit 40 stores information to be used for various processing performed by the wireless communication apparatus 1, and can be implemented by an existing recording medium, for example, Hard Disk Drive (HDD), an optical disk, a memory card, or a Random Access Memory (RAM). The storage unit 40 includes a process-table storage unit 41, a start-process determination-table storage unit 42, a failure-cause location-table storage unit 43, and an output-table storage unit 44. Details of the process-table storage unit 41, the start-process determination-table storage unit 42, the failure-cause location-table storage unit 43, and the output-table storage unit 44 will be described later.

The input receiving unit 50 receives input of various operations from the input unit 10, for example, input of a start operation of starting a fault diagnosis. For example, when a user selects an icon of a fault diagnosis application program displayed on the output unit 20 by using the input unit 10, the input receiving unit 50 receives input of a start operation of starting the fault diagnosis.

The first confirmation unit 55 confirms the presence or absence of a wireless connection to the access point 110, the presence or absence of a connection to the router 120, and the presence or absence of a connection to the server 140.

Specifically, the first confirmation unit 55 confirms the presence or absence of a wireless connection to the access point 110 (the presence or absence of the establishment of an access link) by confirming whether the wireless communication apparatus 1 is connected to any kind of network in the network of the wireless LAN. According to the first embodiment, when a wireless connection is established, information indicating the presence or absence of a wireless connection is stored into the storage unit 40, accordingly, the first confirmation unit 55 can confirm the presence or absence of a wireless connection to the access point 110 by confirming the stored information.

Moreover, the first confirmation unit 55 causes the communication unit 30 to transmit an Internet Control Message Protocol (ICMP) echo request to the router 120, and then confirms the presence or absence of a connection to the router 120 (a connection of an access network) by confirming the presence or absence of a response to the echo request.

Furthermore, the first confirmation unit 55 causes the communication unit 30 to transmit a Hyper Text Transfer Protocol (HTTP) request to the server 140, and then confirms the presence or absence of a connection to the server 140 (an external connection) by confirming the presence or absence of a response to the HTTP request, or the value of a response to the HTTP request.

The process-table storage unit 41 stores a process table that associates each of a plurality of processes of confirmation processing of confirming details of a communication failure with a process number that indicates a position of the each process in an execution order of the processes of the confirmation processing.

FIG. 2 is a diagram of an example of the process table, in which an execution order is set to execute the processes of the confirmation processing in ascending order of the process numbers. In other words, according to the process table shown in FIG. 2, the process numbers are set so as to confirm failure details on the whole in the order of the wireless communication apparatus 1, the access point 110, the router 120, and the server 140. "WCS" shown in FIG. 2 stands for a toggle switch for the wireless LAN function of the apparatus. A term "Auto Configuration Module (Wireless Zero Configuration)" shown in FIG. 2 means a computer program that executes connection processing to a wireless LAN.

The start-process determination-table storage unit 42 stores a start-process determination table that associates a first confirmation result to be obtained by the first confirmation unit 55 with a start number that is the process number of a process from which the confirmation processing is to be started.

FIG. 3 is a diagram of an example of the start-process determination table, in which each of the start numbers is set to start the confirmation processing from a process associated with a failure point confirmed from the first confirmation result. For example, if a wireless connection to the access point 110 is successfully established while a connection to the router 120 fails, the start number is set to a process number 8 of which confirmation processing is of confirming failure details in the router 120. "ANY" shown in FIG. 3 means that the result can be any of success and failure.

The second confirmation unit 60 performs the confirmation processing from a process of the start number associated with a first confirmation result in accordance with the execution order by referring to the process table and the start-process determination table. Specifically, the second confirmation unit 60 executes the confirmation processing of a process of the start number associated with the first confirmation result at first, and then performs the confirmation processing process by process in the order of the process numbers until a processing result of the confirmation processing indicates a failure, or until no more process of the confirmation processing to be executed is left.

The failure-cause location-table storage unit 43 stores a failure-cause location table that associates a second confirmation result to be obtained by the second confirmation unit 60 with a cause of a communication failure. FIG. 4 is a diagram of an example of the failure-cause location table according, in which a second confirmation result (the process number of a process of the confirmation processing of which processing result indicates a failure), the presence or absence of a failure in the network connection, a failure cause, and a failure recovery method are associated with one another.

The locating unit 65 locates a cause of a communication failure based on a second confirmation result. Specifically, the locating unit 65 refers to the failure-cause location table, locates a cause of a communication failure associated with the second confirmation result, and specifies a failure recovery method associated with the second confirmation result. The second confirmation result is the process number of a process of the confirmation processing of which processing result indicates a failure. Alternatively, the locating unit 65 can be configured to locate a failure point in communication based on a first confirmation result.

Figures 5, 6:
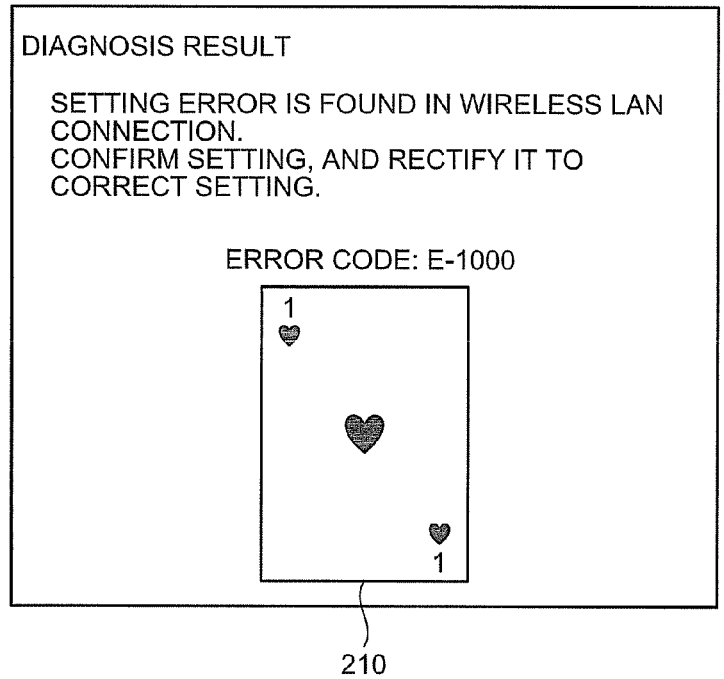
FIG. 5 is a diagram of an example of an output table according to the first embodiment.
FIG. 6 is a diagram of an example of an output form according to the first embodiment.

The output-table storage unit 44 stores an output table that associates a failure cause with a symbol. FIG. 5 is a diagram of an example of the output table, in which a second confirmation result (the process number of a process of the confirmation processing of which processing result indicates a failure), character strings of a cause of a communication failure and a failure recovery method, an error code, and a symbol are associated with one another.

The output control unit 70 causes the output unit 20 to output a location result obtained by the locating unit 65. For example, the output control unit 70 causes the output unit 20 to output the presence or absence of a failure in communication, and a cause of the communication failure and a failure recovery method located by the locating unit 65. The output form from the output control unit 70 can be various forms, for example, picture output, screen image output, or audio output.

Particularly according to the first embodiment, as shown in FIG. 6, the output control unit 70 causes the output unit 20 to display character strings of a failure cause and a failure recovery method located by the locating unit 65, an error code, and a symbol 210, by referring to the output table.

Figure 7:
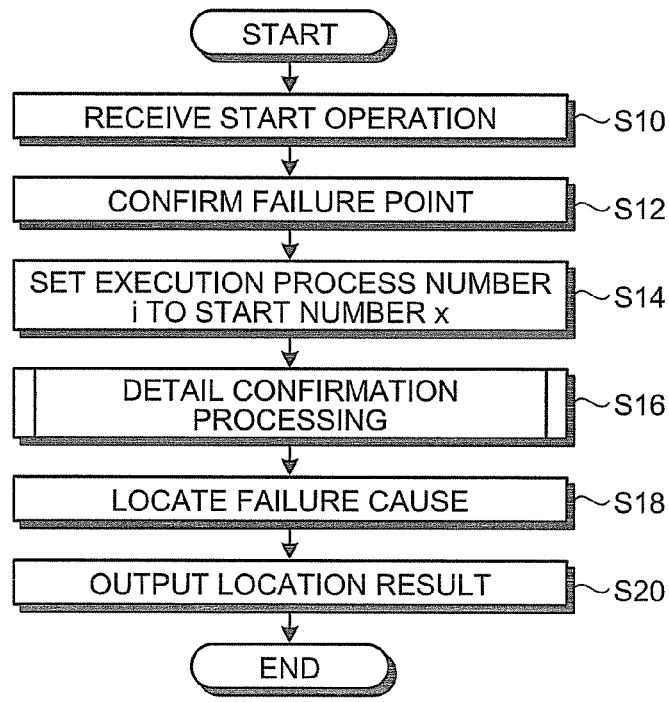
FIG. 7 is a flowchart of an example of fault diagnosis processing according to the first embodiment.

Operation of the wireless communication apparatus according to the first embodiment is explained below with reference to FIG. 7. FIG. 7 is a flowchart of an example of fault diagnosis processing performed by the wireless communication apparatus 1.

To begin with, the input receiving unit 50 receives input of a start operation of starting a fault diagnosis from the input unit 10 (Step S10).

The first confirmation unit 55 then confirms the presence or absence of a wireless connection to the access point 110, the presence or absence of a connection to the router 120, and the presence or absence of a connection to the server 140 (Step S12).

The second confirmation unit 60 then refers to the start-process determination table stored in the start-process determination-table storage unit 42, and sets an execution process number i to a start number x associated with a first confirmation result obtained by the first confirmation unit 55 (Step S14).

Subsequently, the second confirmation unit 60 performs the confirmation processing in accordance with the execution order from a process associated with the execution process number i, and performs detail confirmation processing of confirming failure details (Step S16). Details of the detail confirmation processing will be described later.

The locating unit 65 then refers to the failure-cause location table stored in the failure-cause location-table storage unit 43, and locates a failure cause based on a second confirmation result (the process number of a process of the confirmation processing of which processing result indicates a failure) obtained by the second confirmation unit 60 (Step S18).

The output control unit 70 then causes the output unit 20 to output a location result obtained by the locating unit 65 (Step S20).

If a failure is confirmed from the location result obtained by the locating unit 65, the user performs operation of changing settings of the wireless communication apparatus 1 and other devices in order to remove the failure cause. After that, the fault diagnosis processing is performed again, and it is confirmed whether the failure is eliminated.

Figure 8:
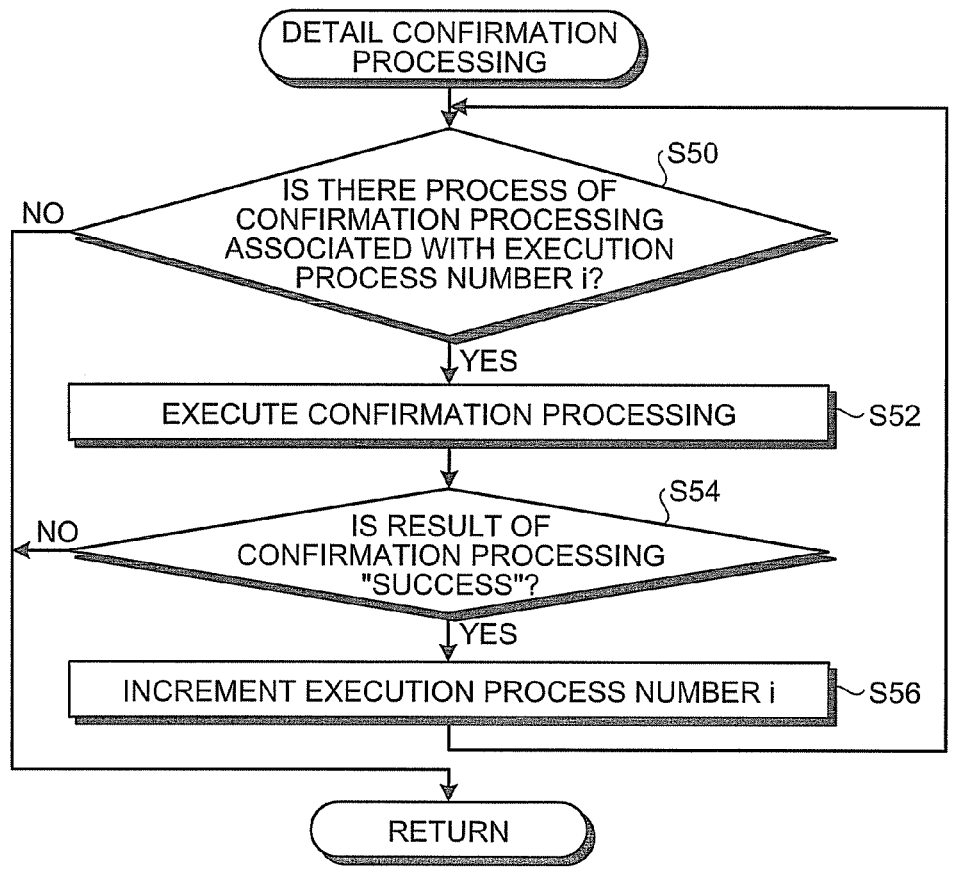
FIG. 8 is a flowchart of an example of detail confirmation processing according to the first embodiment.

The detail confirmation processing shown at Step S16 in FIG. 7 is explained below with reference to FIG. 8. FIG. 8 is a flowchart of an example of the detail confirmation processing.

To begin with, the second confirmation unit 60 refers to the process table stored in the process-table storage unit 41, and determines whether there is a process of the confirmation processing associated with the execution process number i (Step S50).

If there is a process of the confirmation processing associated with the execution process number i (Yes at Step S50), the second confirmation unit 60 executes the process (Step S52), and determines whether a result of the confirmation processing indicates a success (Step S54).

If a result of the confirmation processing indicates a success (Yes at Step S54), the second confirmation unit 60 increments the execution process number i (Step S56), and determines whether there is a process of the confirmation processing associated with the execution process number i (going to Step S50).

By contrast, if there is no process of the confirmation processing associated with the execution process number i (No at Step S50), or if a result of the confirmation processing does not indicates a success (if indicating a failure) (No at Step S54), the detail confirmation processing is terminated.

In this way, according to the first embodiment, a failure point in communication is located by confirming the presence or absence of a wireless connection to the access point, the presence or absence of a connection to the router, and the presence or absence of a connection to the server, so that a user without having specialized knowledge can easily locate and remove a cause of a communication failure.

Moreover, according to the first embodiment, the confirmation processing of confirming failure details is started from a located failure point, thereby omitting unnecessary processes of the confirmation processing to locate a failure cause, and reducing a fault diagnosis time.

Furthermore, according to the first embodiment, a symbol associated with a failure cause and a failure recovery method is output, so that even a user who cannot understand the failure cause and the failure recovery method can tell the symbol to a customer support center, and can receive an instruction for a failure recovery.

According to a second embodiment of the present invention, explained below is an example of that a history of a second confirmation result obtained by the second confirmation unit (the process number of a process of the confirmation processing resulting in failure) is recorded, and then a process of the confirmation processing to be executed at first by the second confirmation unit is determined by using the history.

Mainly differences from the first embodiment are explained below, and components that have functions similar to the first embodiment are assigned with the same names and the same reference numerals as those of the first embodiment, and explanations of them are omitted.

Figure 9:
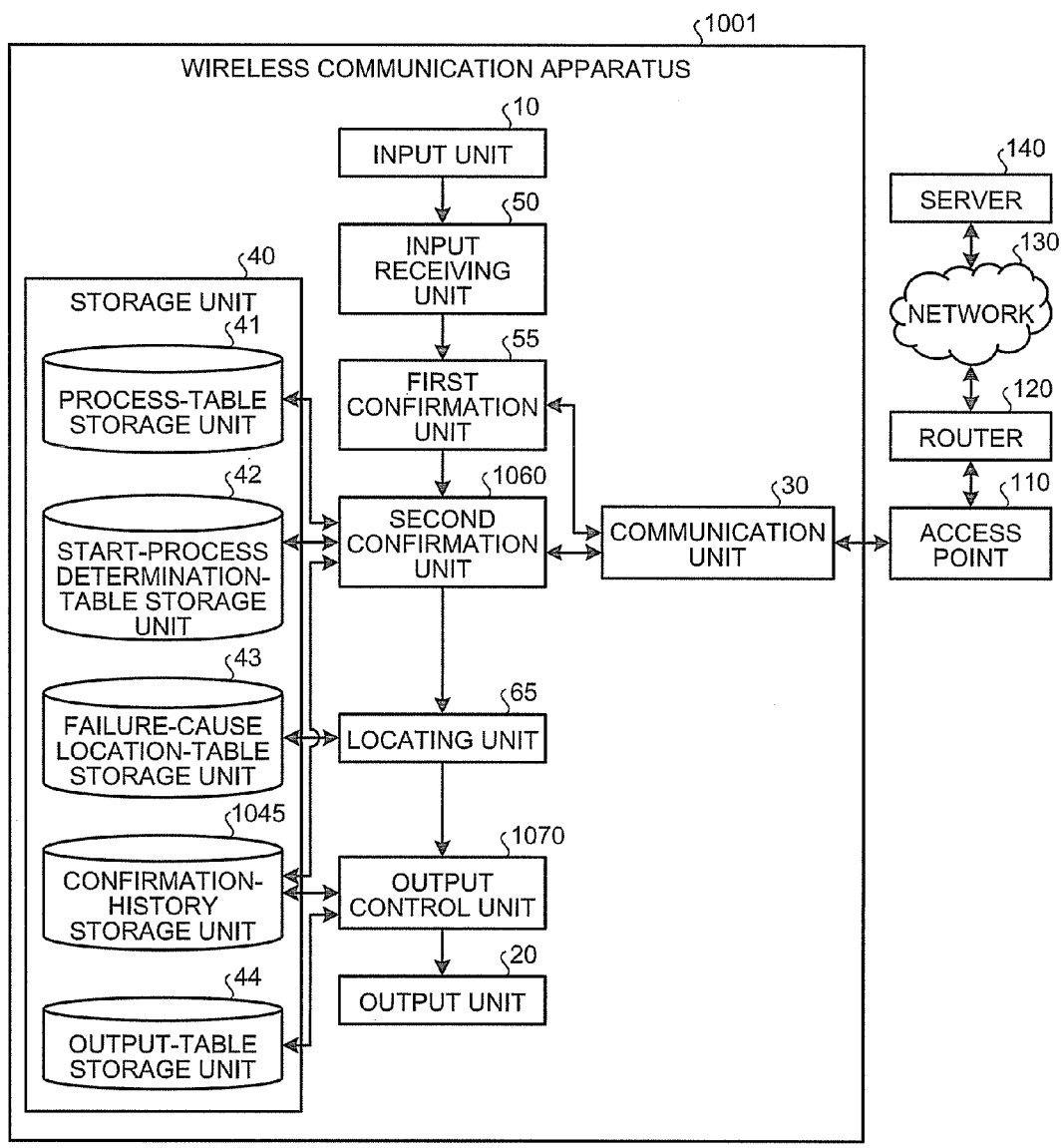
FIG. 9 is a functional block diagram of an example of a configuration of a wireless communication apparatus according to a second embodiment of the present invention.

FIG. 9 is a functional block diagram of an example of a configuration of a wireless communication apparatus 1001 according to the second embodiment. The wireless communication apparatus 1001 differs from the first embodiment in an aspect that a storage unit 1040 further includes a confirmation-history storage unit 1045. Moreover, a second confirmation unit 1060 and an output control unit 1070 are different from the first embodiment.

The confirmation-history storage unit 1045 stores a second confirmation result obtained by the second confirmation unit 1060 as a confirmation history. Specifically, the confirmation-history storage unit 1045 stores a process number of a process of the confirmation processing of which processing result indicates a failure, and a time point at which the confirmation processing is performed, as a confirmation history in accordance with an instruction given by the second confirmation unit 1060. A form of a confirmation history is not limited to this, and can be associated with a failure cause or a failure recovery method.

The second confirmation unit 1060 performs a last-performed process of the confirmation processing as indicated in the confirmation history stored in the confirmation-history storage unit 1045, and determines in accordance with a result of the confirmation processing whether to start the confirmation processing from a process of the start number associated with a first confirmation result obtained by the first confirmation unit 55, or to start the confirmation processing from a last-performed process as indicated in the confirmation history.

The output control unit 1070 causes the output unit 20 to output a character string, a symbol, and the like that are associated with a location result obtained by the locating unit 65 and a content of the confirmation history.

Figure 10:
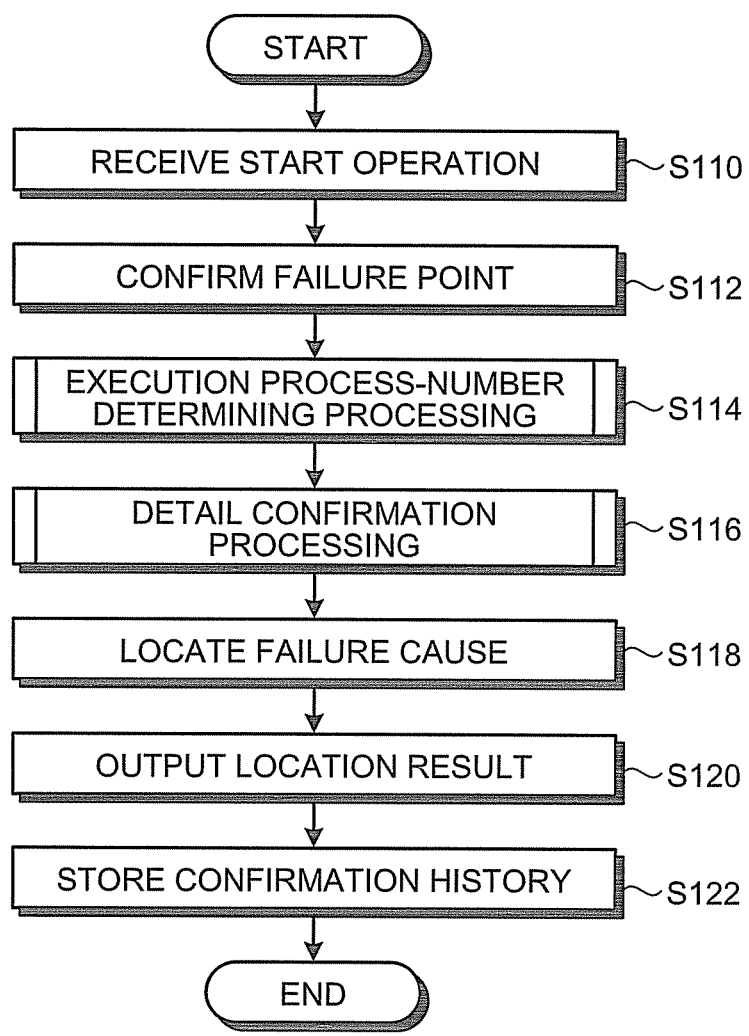
FIG. 10 is a flowchart of an example of fault diagnosis processing according to the second embodiment.

Operation of the wireless communication apparatus according to the second embodiment is explained below with reference to FIG. 10. FIG. 10 is a flowchart of an example of a flow of fault diagnosis processing performed by the wireless communication apparatus 1001.

To begin with, processes from receiving input of a start operation to confirming a failure point (Step S110 to Step S112) are similar to the processes from Step S10 to Step S12 according to the first embodiment, therefore, explanations of them are omitted.

The second confirmation unit 1060 then performs the confirmation processing of a last-performed process of a process number y as indicated in the confirmation history stored in the confirmation-history storage unit 1045. In accordance with a result of the confirmation processing, the second confirmation unit 1060 performs execution process-number determining processing of determining whether the execution process number i is set to the start number x associated with the first confirmation result obtained by the first confirmation unit 55, or to a process number y+1 indicated by the confirmation history (Step S114). Details of the execution process-number determining processing will be explained later.

Processes from the detail confirmation processing to outputting a location result (Step S116 to Step S120) are similar to the processes from Step S16 to Step S20 according to the first embodiment, therefore, explanations of them are omitted.

The confirmation-history storage unit 1045 then stores a second confirmation result obtained by the second confirmation unit 1060 as a confirmation history (Step S122).

Figure 11:
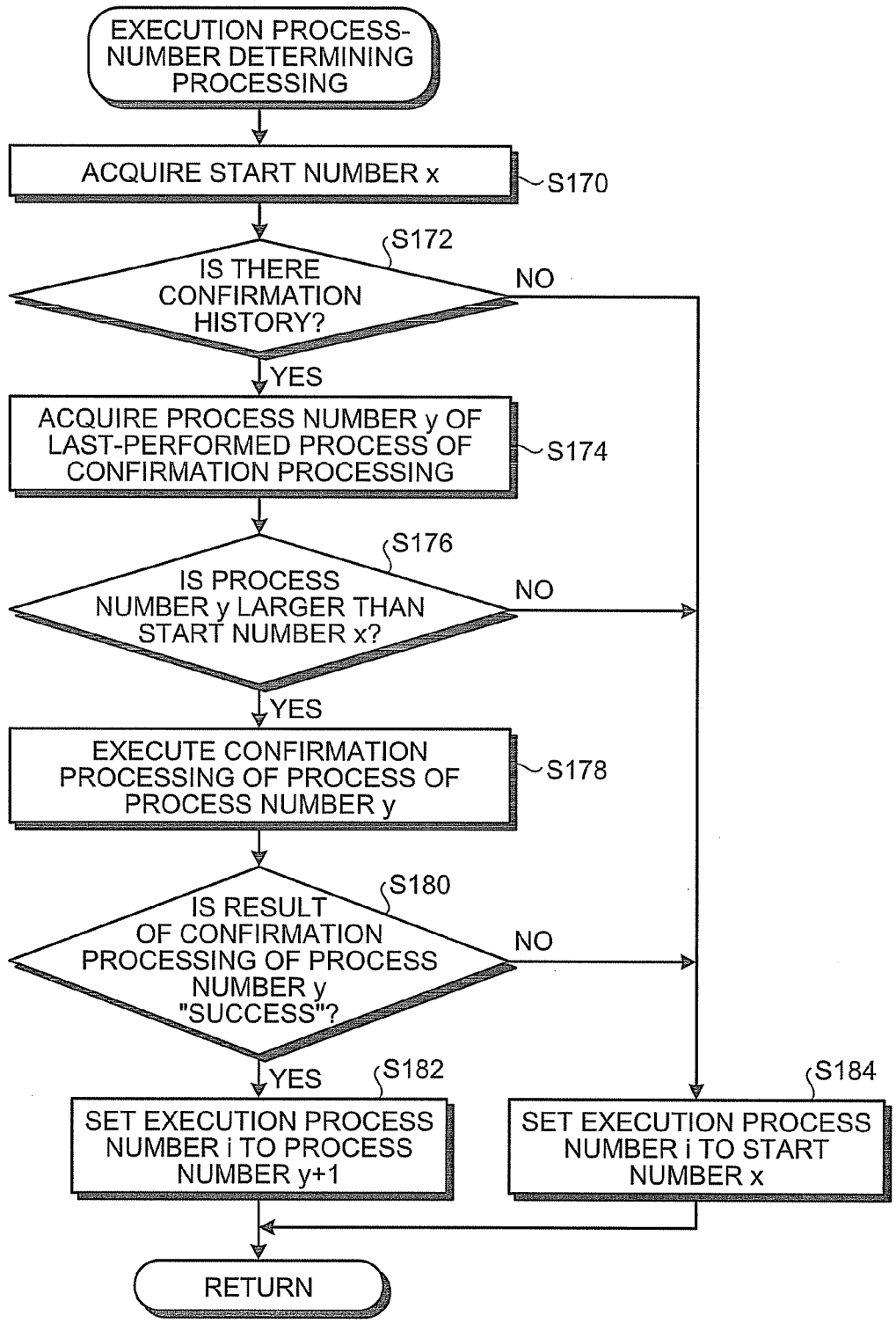
FIG. 11 is a flowchart of an example of execution process-number determining processing according to the second embodiment.

The execution process-number determining processing shown at Step S114 in FIG. 10 is explained below with reference to FIG. 11.

To begin with, the second confirmation unit 1060 acquires the start number x associated with a first confirmation result obtained by the first confirmation unit 55 by referring to the start-process determination table stored in the start-process determination-table storage unit 42 (Step S170).

The second confirmation unit 1060 then confirms whether a confirmation history is stored in the confirmation-history storage unit 1045 (Step S172).

When the confirmation history is stored in the confirmation-history storage unit 1045 (Yes at Step S172), the second confirmation unit 1060 acquires the process number y of a last-performed process of the confirmation processing as indicated in the confirmation history (Step S174).

The second confirmation unit 1060 then compares the start number x and the process number y (Step S176). If the process number y is larger than the start number x (Yes at Step S176), the second confirmation unit 1060 executes the confirmation processing of the process of the process number y (Step S178).

The second confirmation unit 1060 then confirms a processing result of the process of the process number y (Step S180). If the processing result indicates a success (Yes at Step S180), the second confirmation unit 1060 sets the process number y+1 to the execution process number i (Step S182).

By contrast, if confirmation history is not stored in the confirmation-history storage unit 1045 (No at Step S172), or if the process number y is not larger than the start number x (No at Step S176), or if a processing result of the process of the process number y indicates a failure (No at Step S180), the second confirmation unit 1060 sets the start number x to the execution process number i (Step S184).

In this way, according to the second embodiment, a start process of the confirmation processing of confirming failure details is determined based on a located failure point by using a first confirmation result and a confirmation history. Consequently, according to the second embodiment, when performing the fault diagnosis processing again after a user performs operation of eliminating a failure cause, the confirmation history is referred for determining a start process of the confirmation processing, so that unnecessary processes of the confirmation processing can be omitted.

According to a third embodiment of the present invention, explained below is an example that a wireless communication apparatus includes a wireless LAN interface (for example, IEEE 802.11g) and a wired LAN interface (for example, IEEE 802.3), and establishes communication by using either of the interfaces.

Mainly differences from the first embodiment are explained below, and components that have functions similar to the first embodiment are assigned with the same names and the same reference numerals as those of the first embodiment, and explanations of them are omitted.

Figure 12:
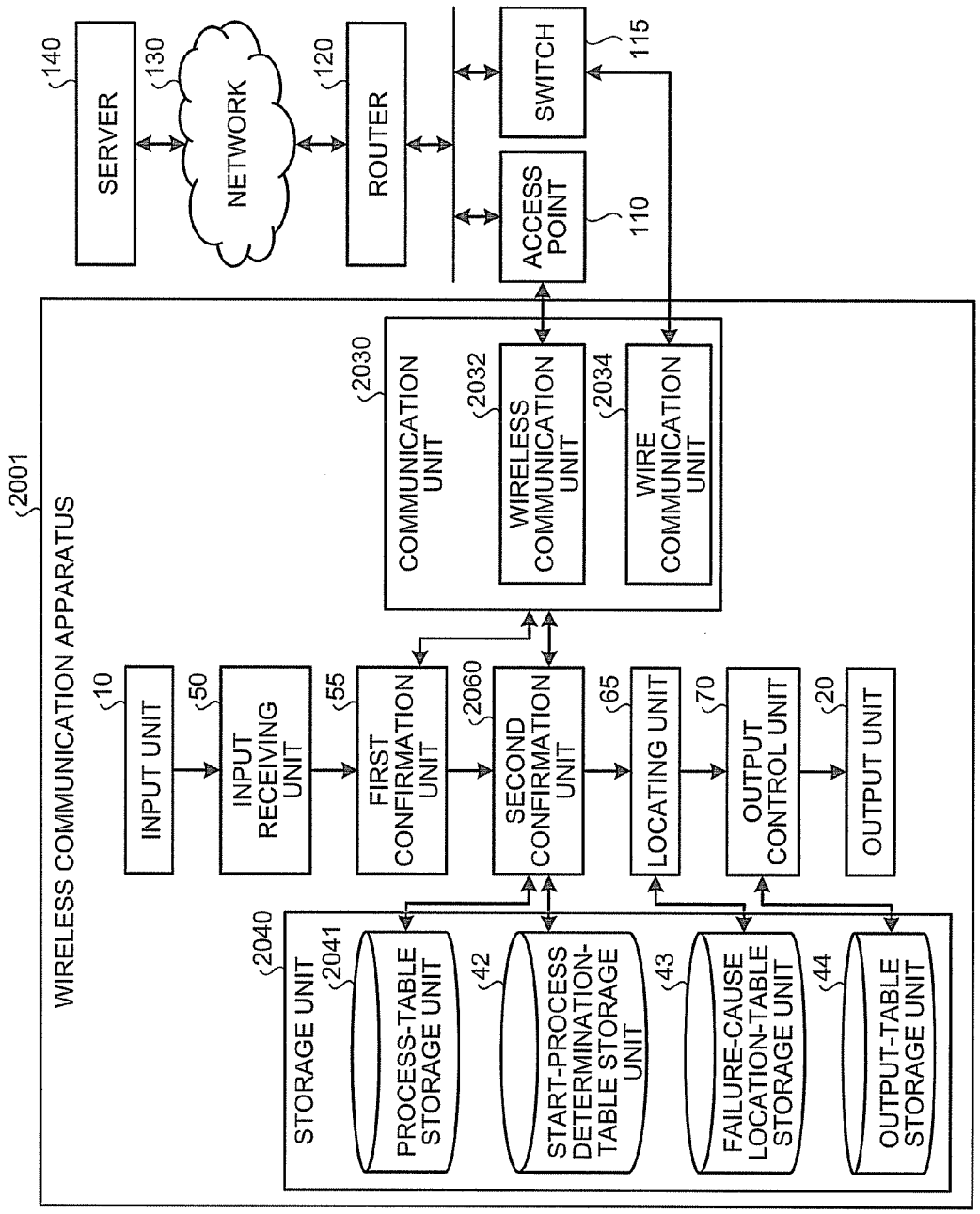
FIG. 12 is a functional block diagram of an example of a configuration of a wireless communication apparatus according to a third embodiment of the present invention.

FIG. 12 is a functional block diagram of an example of a configuration of a wireless communication apparatus 2001 according to the third embodiment. The wireless communication apparatus 2001 differs from the first embodiment in an aspect that a communication unit 2030 further includes a wireless communication unit 2032 and a wired communication unit 2034, and the wire communication unit 2034 is connected to the router 120 via a switch 115 according to a communication method, such as IEEE 802.3. Moreover, a second confirmation unit 2060 and a process-table storage unit 2041 included in a storage unit 2040 are different from the first embodiment.

The process-table storage unit 2041 stores a process table that associates each of a plurality of processes of confirmation processing of confirming details of a communication failure with a process number of the each process, and an execution instruction number that is a process number of another process to be executed after the confirmation processing. FIG. 13 is a diagram of an example of the process table, in which each process is associated with a process number of another process to be executed after the process of the confirmation processing fails (process number for a failed case), and a process number of another process to be executed after the process of the confirmation processing succeeds (process number for a successful case) as an execution instruction number. The process table shown in FIG. 13 includes a process of confirming setting of the wire LAN interface.

The second confirmation unit 2060 performs the confirmation processing from a process of the start number associated with a first confirmation result obtained by the first confirmation unit 55, and then in accordance with the execution order indicated by the execution instruction number.

According to the third embodiment, the start-process determination-table storage unit 42 stores, for example, the start-process determination table shown in FIG. 14, and the failure-cause location-table storage unit 43 stores, for example, the failure-cause location table shown in FIG. 15.

Figure 16:
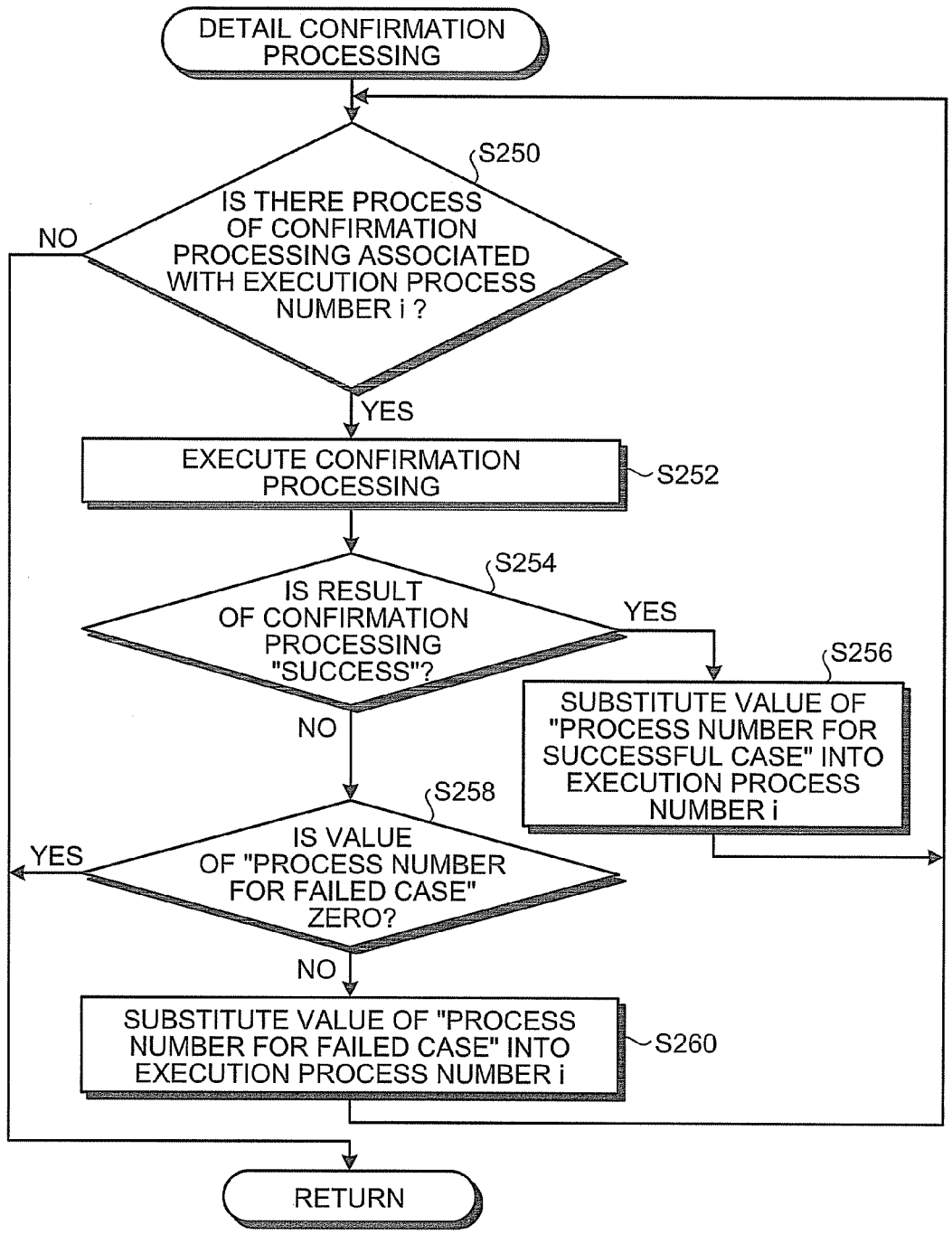
FIG. 16 is a flowchart of an example of detail confirmation processing according to the third embodiment.

Operation of the wireless communication apparatus according to the third embodiment is explained below. The fault diagnosis processing performed by the wireless communication apparatus 2001 is similar to the flowchart shown in FIG. 7, therefore, explanation of it is omitted, and processes of detail confirmation processing different in processing details from the first embodiment are explained below. FIG. 16 is a flowchart of an example of the detail confirmation processing.

To begin with, processes from confirming the presence of a process of the confirmation processing to confirming success or failure of a result of the confirmation processing (Step S250 to Step S254) are similar to the processes from Step S50 to Step S54 according to the first embodiment, therefore, explanations of them are omitted.

If a result of the confirmation processing indicates a success (Yes at Step S254), the second confirmation unit 2060 then substitutes the value of a process number for a successful case into the execution process number i (see FIG. 13) (Step S256), and determines whether there is a process of the confirmation processing associated with the execution process number i (going to Step S250).

By contrast, if a result of the confirmation processing does not indicates success (if indicating a failure) (No at Step S254), the second confirmation unit 2060 confirms whether the value of a process number for a failed case (see FIG. 13) is zero (Step S258). If the value of the process number for a failed case is not zero (No at Step S258), the second confirmation unit 2060 substitutes the value of the process number for a failed case into the execution process number i (Step S260), and determines whether there is a process of the confirmation processing associated with the execution process number i (going to Step S250).

If there is no process of the confirmation processing associated with the execution process number i (No at Step S250), or if the value of the process number for a failed case is zero (Yes at Step S258), the detail confirmation processing is terminated.

In this way, according to the third embodiment, the fault diagnosis is performed on the wire LAN interface as well as the wireless LAN interface, so that a fault diagnosis in a wider scope can be performed.

The wireless communication apparatus 2001 can be configured to select whether to be connected to a wireless LAN interface or to be connected to a wire LAN interface at random, or based on the priority of each of the LAN interfaces or a connection history to the LAN interfaces, or can be configured to allow a user to select a LAN interface.

According to a fourth embodiment of the present invention, explained below is an example that a setting screen for changing setting at a location represented by a failure cause is output, and then a user is allowed to change the setting.

Mainly differences from the first embodiment are explained below, and components that have functions similar to the first embodiment are assigned with the same names and the same reference numerals as those of the first embodiment, and explanations of them are omitted.

Figure 17:
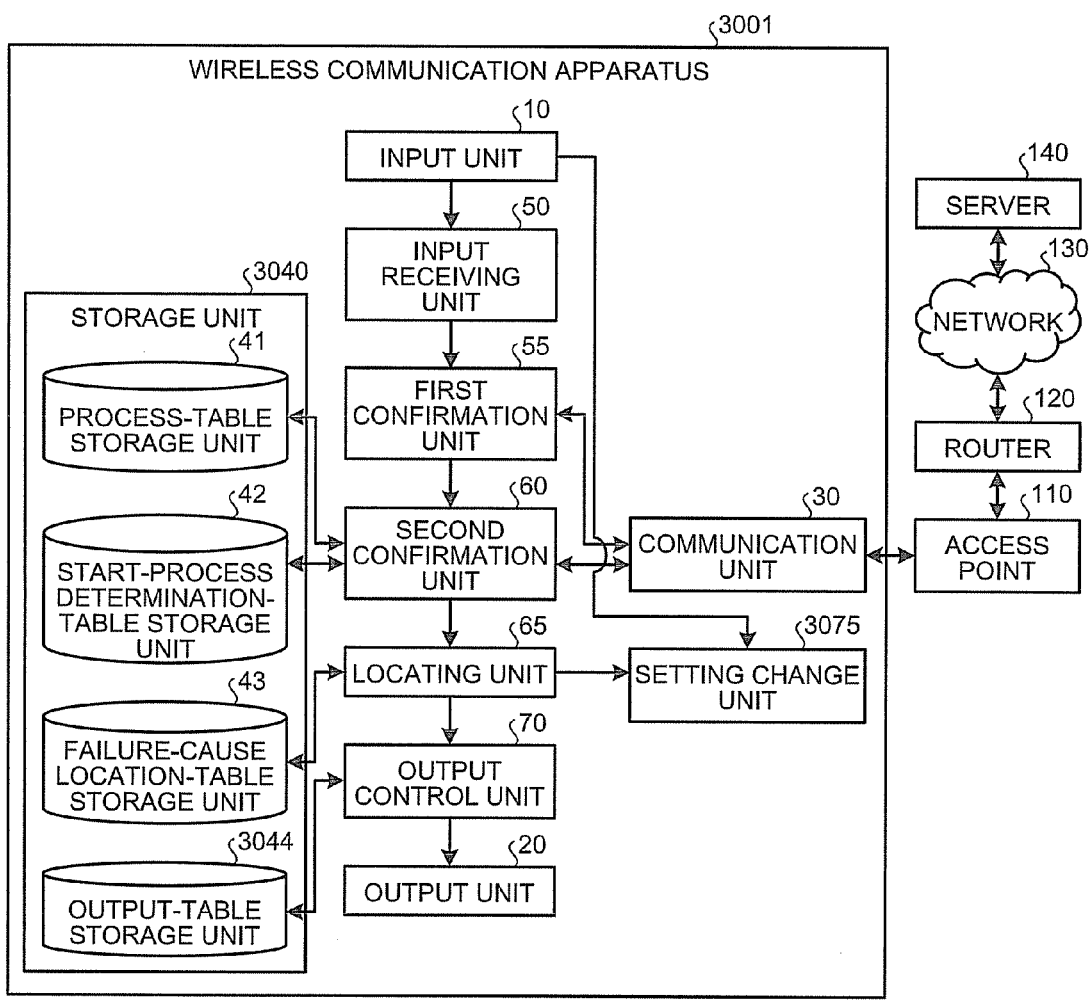
FIG. 17 is a functional block diagram of an example of a configuration of a wireless communication apparatus according to a fourth embodiment of the present invention.

FIG. 17 is a functional block diagram of an example of a configuration of a wireless communication apparatus 3001 according to the fourth embodiment. The wireless communication apparatus 3001 differs from the first embodiment in an aspect that a setting change unit 3075 is further included. Moreover, an output-table storage unit 3044 included in a storage unit 3040 is different from the first embodiment.

The output-table storage unit 3044 stores an output table that associates a failure cause with a setting screen that indicates setting at a location represented by the failure cause.

Figures 18, 19:
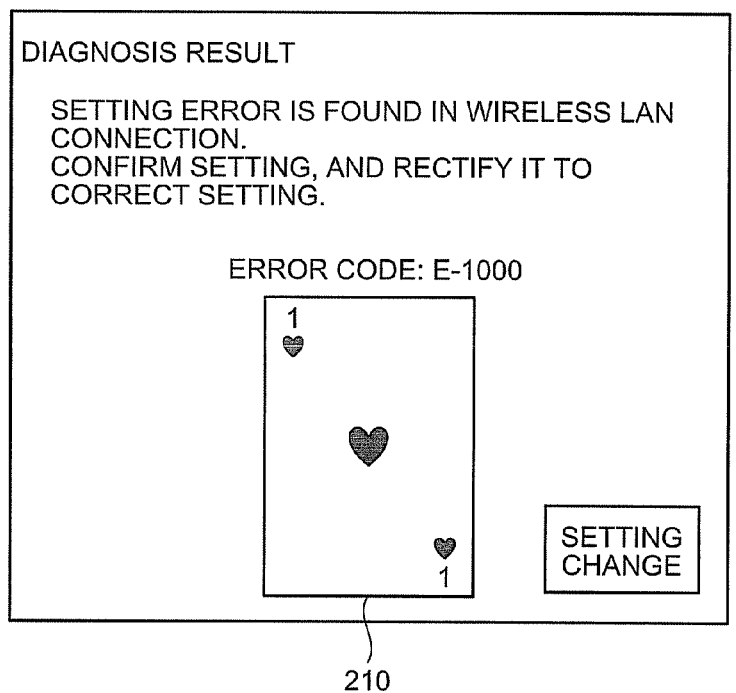
FIG. 18 is a diagram of an example of an output table according to the fourth embodiment.
FIG. 19 is a diagram of an example of an output form according to the fourth embodiment.

FIG. 18 is a diagram of an example of the output table, in which a second confirmation result (the process number of a process of the confirmation processing of which processing result indicates a failure), character strings of a cause of a communication failure and a failure recovery method, an error code, a symbol, and a window (setting screen) are associated with one another.

The output control unit 70 causes the output unit 20 to output a setting screen associated with a failure cause located by the locating unit 65, by referring to the output table. For example, to begin with as shown in FIG. 19, the output control unit 70 causes the output unit 20 to display character strings of a failure cause located by the locating unit 65 and a failure recovery method, an error code, and the symbol 210. When the user then selects a setting change button shown in FIG. 19, the output control unit 70 causes the output unit 20 to display a setting screen shown in FIG. 20 or 21.

The input receiving unit 50 receives input of a setting change operation of changing the setting indicated by the setting screen displayed on the output unit 20.

The setting change unit 3075 changes the setting in accordance with the setting change operation received by the input receiving unit 50.

Operation of the wireless communication apparatus according to the fourth embodiment is explained below with reference to FIG. 22. FIG. 22 is a flowchart of an example of a flow of fault diagnosis processing performed by the wireless communication apparatus 3001.

To begin with, processes from receiving input of a start operation to locating a failure cause (Step S310 to Step S318) are similar to the processes from Step S10 to Step S18 according to the first embodiment, therefore, explanations of them are omitted.

The output control unit 70 then causes the output unit 20 to output a location result obtained by the locating unit 65, and causes the output unit 20 to output a setting screen associated with the failure cause located by the locating unit 65 (Step S320).

The input receiving unit 50 then receives a setting-change request operation of requesting for change in setting indicated by the setting screen displayed on the output unit 20 (Step S322).

The setting change unit 3075 then changes the setting in accordance with the setting-change request operation received by the input receiving unit 50 (Step S324).

In this way, according to the fourth embodiment, because the setting screen indicating setting at a location represented by a failure cause is output, the user can easily change the setting at the location represented by the failure cause.

Instead of the setting screen, a shortcut for outputting the setting screen can be output.

Further effects or modifications can be easily derived by a person skilled in the art. Therefore, a form in a wider scope of the present invention is not limited to the specific details and the typical embodiments as described above. Various changes in the embodiments according to the present invention can be feasible without departing from the total concept and the scope of the present invention defined by the accompanying claims and equivalents of them.

According to each of the above embodiment, a failure point of a communication failure is confirmed, and then the confirmation processing of confirming details of the communication failure is executed from the confirmed failure point. However, the processing of those processes can be collectively performed.

For example, when confirming failure details in the order of the access point, the router, and the server, a fault diagnosis processing is executed in accordance with a flowchart shown in FIG. 25 by using a process table shown in FIG. 23 and a failure-cause location table shown in FIG. 24. The flowchart shown in FIG. 25 is similar to the flowcharts shown in FIGS. 7 and 8 except that the execution process number i is set to 1 at Step S420, therefore, detailed explanation of it is omitted.

When confirming failure details in the order of the server, the router, the access point, and the wireless communication apparatus, a fault diagnosis processing is executed in accordance with a flowchart shown in FIG. 28 by using a process table shown in FIG. 26 and a failure-cause location table shown in FIG. 27. The flowchart shown in FIG. 28 is similar to the flowcharts shown in FIGS. 7 and 8 except that the execution process number i is set to 0 at Step S512, and it is confirmed at Step S518 whether a processing result of the confirmation processing indicates a failure, therefore, detailed explanation of it is omitted.

Although according to the fourth embodiment, explained above is the example that a setting screen for changing setting at a location represented by a failure cause is output, and then a user is allowed to change the setting. The wireless communication apparatus can be configured to change setting automatically when outputting a location result of a failure cause. In such case, the storage unit can be configured to include a setting-change table storage unit that stores a setting-change table (see FIG. 29) that associates a failure cause with details of change in setting at a location represented by the failure cause, and the setting change unit can be configured to change the setting in accordance with the details of the change in the setting associated with the failure cause. Accordingly, the user does not need to perform an operation of removing the failure.

Moreover, according to each of the above embodiments, explained above is the example that a symbol associated with a failure cause is output. However, the wireless communication apparatus can be configured to output a two-dimensional code that a failure cause and an e-mail address of a customer support center are encoded. Accordingly, a user can make contact with the customer support center by using a communication terminal, such as a mobile phone, even when a contact with the customer support center by using the wireless communication apparatus is not available because a communication failure is occurring.

Furthermore, according to each of the above embodiments, the wireless communication apparatus itself outputs a failure cause and other information. However, it can be configured to output a failure cause and other information onto another device by using the communication unit and a proximity wireless communication function (for example, infrared-ray communication, Bluetooth (registered trademark), or International Mobile Telecommunications 2000 (IMT-2000)).

Moreover, each of the above embodiments can be configured such that a mobile terminal includes only a wired LAN interface (for example, IEEE 802.3), and confirms a link state of an access link (whether it is linked up) in order to confirm the availability of establishment of the access link.

Furthermore, each of the above embodiments can be combined as required.

Each of the wireless communication apparatuses 1, 1001, 2001, and 3001 according to the respective embodiments has a hardware configuration that includes a control device, such as a Central Processing Unit (CPU), storage devices, such as a Read-Only Memory (ROM) and a Random Access Memory (RAM), a display device, such as a liquid crystal display, an input device, such as a keyboard, an audio output device, such as a speaker, a communication interface configured to be connected to a network and to perform communication, and the like.

A fault diagnosis program to be executed by each of the wireless communication apparatuses 1, 1001, 2001, and 3001 according to the respective embodiments is to be provided as a computer program product by being recorded in a file in an installable format or an executable format, onto a computer-readable recording medium, such as a Compact Disk Read Only Memory (CD-ROM), a Flexible Disk (FD), a Compact Disk Recordable (CD-R), or a Digital Versatile Disk (DVD).

Moreover, the fault diagnosis program to be executed by each of the wireless communication apparatuses 1, 1001, 2001, and 3001 according to the respective embodiments can be configured to be provided by being preliminarily incorporated in the ROM or another storage device.

Furthermore, the fault diagnosis program to be executed by each of the wireless communication apparatuses 1, 1001, 2001, and 3001 according to the respective embodiments has a module configuration that includes the units described above (the input receiving unit, the first confirmation unit, the second confirmation unit, the locating unit, the output control unit, and the like). As actual hardware, the CPU (processor) reads the fault diagnosis program from one of the recording media and executes it, and then the above units are loaded on a main memory, so that the input receiving unit, the first confirmation unit, the second confirmation unit, the locating unit, the output control unit, and the like are created on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer program product having a non-transitory computer readable medium including programmed instructions to diagnose a failure configured to be executable by a computer, wherein the instructions, when executed by a computer, cause the computer to perform:
   performing a first confirmation of confirming presence of a connection to a correspondent node in a first communication layer, presence of a connection to a correspondent node in a second communication layer differing from the first communication layer, and presence of a connection to a correspondent node in a third communication layer differing from the first communication layer and the second communication layer;
   locating where a communication failure occurs among the computer, the correspondent node in the first communication layer, the correspondent node in the second communication layer, and the correspondent node in the third communication layer, based on a result of the first confirmation; and
   performing output control of causing an output unit to output a result of the locating,
   wherein
      the first communication layer, the second communication layer, and the third communication layer are each a layer of a TCP/IP protocol architecture.

2. The computer program product according to claim 1, wherein
   a process table is stored that associates each of a plurality of processes of confirmation processing of confirming details of a communication failure with a process number indicating a position of the each process in an execution order of the processes of the confirmation processing; and
   a start-process determination table is stored that associates a result of the first confirmation with a start number that is a process number of a process from which the confirmation processing is to be started, and wherein
   the instructions further cause the computer to execute performing a second confirmation, which is the confirmation processing, from the process of a start number associated with the result of the first confirmation in accordance with the execution order; and
   a failure cause of a communication failure is located by the locating based on a result of the second confirmation.

3. The computer program product according to claim 2, wherein
   the confirmation processing is performed in the second confirmation in accordance with the execution order until a processing result of the confirmation processing indicates a failure; and
   the failure cause is located by the locating based on the result of the second confirmation that is the process number of a process of the confirmation processing of which processing result indicates a failure.

4. The computer program product according to claim 3, wherein
   a result of the second confirmation is stored as a confirmation history; and
   a last-performed process of the confirmation processing as indicated in the confirmation history is performed in the second confirmation, and when the confirmation processing fails, the confirmation processing is started from a process of a process number included between the start number associated with the result of the first confirmation and the process number of the last-performed process of the confirmation processing as indicated in the confirmation history.

5. The computer program product according to claim 3, wherein
   a result of the second confirmation is stored as a confirmation history; and
   a last-performed process of the confirmation processing as indicated in the confirmation history is performed in the second confirmation, and when the confirmation processing succeeds, the confirmation processing is started from a process of a process number after the process number of the last-performed process of the confirmation processing as indicated in the confirmation history.

6. The computer program product according to claim 2, wherein
   a failure-cause location table is stored that associates a result of the second confirmation with a failure cause; and
   the failure cause is located by the locating to a failure cause associated with the result of the second confirmation.

7. The computer program product according to claim 6, wherein
   the failure-cause location table is stored that further associates a result of the second confirmation with a failure recovery method; and
   the failure recovery method is specified by the locating to a failure recovery method associated with the result of the second confirmation.

8. The computer program product according to claim 2, wherein an output table is stored that associates the failure cause with a symbol; and the output unit is caused by the performing the output control to output the symbol associated with the failure cause.

9. The computer program product according to claim 2, wherein an output table is stored that associates the failure cause with a setting screen indicating setting at a location represented by the failure cause, wherein the instructions further cause the computer to perform:

receiving a setting-change operation of changing setting indicated by the setting screen output by the output unit; and changing setting in accordance with the setting-change operation, and wherein the output unit is caused by the performing the output control to output the setting screen associated with the failure cause.

10. The computer program product according to claim 2, wherein the output unit is caused by the performing the output control to output a two-dimensional code that the failure cause and an e-mail address of a customer support center are encoded.

11. The computer program product according to claim 2, wherein a setting-change table is stored that associates the failure cause with a content of change in setting at a location represented by the failure cause, and wherein the instructions further cause the computer to perform changing setting in accordance with the content of the change in the setting associated with the failure cause.

12. The computer program product according to claim 1, wherein a process table is stored that associates each of a plurality of processes of confirmation processing of confirming details of a communication failure with a process number of the each process of the confirmation processing, and an execution instruction number that is a process number of a process of the confirmation processing to be executed after the process of the confirmation processing; and a start-process determination table is stored that associates a result of the first confirmation with a start number that is a process number of a process from which the confirmation processing is to be started, and wherein the instructions further cause the computer to execute performing a second confirmation, which is the confirmation processing, from the process of a start number associated with the result of the first confirmation in accordance with an execution order indicated by the execution instruction number; and a failure cause of a communication failure is located by the locating based on a result of the second confirmation.

13. The computer program product according to claim 1, wherein at least one of the first communication layer, the second communication layer, and the third communication layer is wireless connection.

14. The computer program product according to claim 1, wherein at least one of the first communication layer, the second communication layer, and the third communication layer is wired connection.

15. The computer program product according to claim 1, wherein the first communication layer is a network interface layer of the TCP/IP protocol architecture;

the second communication layer is an internet layer of the TCP/IP protocol architecture; and the third communication layer is an application layer of the TCP/IP protocol architecture.

16. A failure diagnosis method comprising:

performing a first confirmation of confirming presence of a connection to a correspondent node in a first communication layer, presence of a connection to a correspondent node in a second communication layer differing from the first communication layer, and presence of a connection to a correspondent node in a third communication layer differing from the first communication layer and the second communication layer;

locating where a communication failure occurs among the computer, the correspondent node in the first communication layer, the correspondent node in the second communication layer, and the correspondent node in the third communication layer, based on a result of the first confirmation; and causing an output unit to output a result of the locating, wherein the first communication layer, the second communication layer, and the third communication layer are each a layer of a TCP/IP protocol architecture.

17. The method according to claim 16, wherein the first communication layer is a network interface layer of the TCP/IP protocol architecture;

the second communication layer is an internet layer of the TCP/IP protocol architecture; and the third communication layer is an application layer of the TCP/IP protocol architecture.

18. A communication apparatus comprising:

a first confirmation unit that performs a first confirmation of confirming presence of a connection to a correspondent node in a first communication layer, presence of a connection to a correspondent node in a second communication layer differing from the first communication layer, and presence of a connection to a correspondent node in a third communication layer differing from the first communication layer and the second communication layer;

a locating unit that locates where a communication failure occurs among the computer, the correspondent node in the first communication layer, the correspondent node in the second communication layer, and the correspondent node in the third communication layer, based on a result of the first confirmation; and an output unit that outputs a result of the locating, wherein the first communication layer, the second communication layer, and the third communication layer are each a layer of a TCP/IP protocol architecture.

19. The apparatus according to claim 18, wherein the first communication layer is a network interface layer of the TCP/IP protocol architecture;

the second communication layer is an internet layer of the TCP/IP protocol architecture; and the third communication layer is an application layer of the TCP/IP protocol architecture.

20. A communication apparatus comprising:

a processor that performs a first confirmation of confirming presence of a connection to a correspondent node in a first communication layer, presence of a connection to a correspondent node in a second communication layer differing from the first communication layer, and presence of a connection to a correspondent node in a third communication layer differing from the first communication layer and the second communication layer, wherein the processor locates where a communication failure occurs among the computer, the correspondent node in the first communication layer, the correspondent node in the second communication layer, and the correspondent node in the third communication layer, based on a result of the first confirmation; and the processor outputs a result of the locating, wherein
the first communication layer, the second communication layer, and the third communication layer are each a layer of a TCP/IP protocol architecture.

21. The apparatus according to claim 20, wherein
the first communication layer is a network interface layer of the TCP/IP protocol architecture;
the second communication layer is an internet layer of the TCP/IP protocol architecture; and
the third communication layer is an application layer of the TCP/IP protocol architecture.

* * * * *